United States Patent
Kim

(10) Patent No.: US 8,786,563 B2
(45) Date of Patent: Jul. 22, 2014

(54) MOBILE TERMINAL AND METHOD OF CONTROLLING THE SAME

(75) Inventor: Seunghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 13/306,838

(22) Filed: Nov. 29, 2011

(65) Prior Publication Data

US 2012/0274581 A1    Nov. 1, 2012

(30) Foreign Application Priority Data

Apr. 29, 2011  (KR) ........................ 10-2011-0040911

(51) Int. Cl.
| | | |
|---|---|---|
| *G06F 3/041* | (2006.01) | |
| *G06F 3/048* | (2013.01) | |
| *G06F 3/0488* | (2013.01) | |
| *G06F 3/0482* | (2013.01) | |
| *G06F 3/0486* | (2013.01) | |

(52) U.S. Cl.
CPC ............ *G06F 3/0482* (2013.01); *G06F 3/0488* (2013.01); *G06F 3/0486* (2013.01)
USPC ............................ 345/173; 715/835; 715/863

(58) Field of Classification Search
CPC ........ G06F 3/041; G06F 3/048; G06F 3/0482
USPC .......... 345/173–174, 179, 810, 825, 835, 863
See application file for complete search history.

(56) References Cited

U.S. PATENT DOCUMENTS

| | | | | |
|---|---|---|---|---|
| 7,817,168 | B2 * | 10/2010 | Nagiyama et al. | 345/661 |
| 2009/0160822 | A1 * | 6/2009 | Eguchi et al. | 345/174 |
| 2009/0222766 | A1 * | 9/2009 | Chae et al. | 715/835 |
| 2010/0182265 | A1 * | 7/2010 | Kim et al. | 345/173 |
| 2010/0220067 | A1 * | 9/2010 | Yang | 345/173 |
| 2010/0321345 | A1 * | 12/2010 | Pearce et al. | 345/179 |

* cited by examiner

*Primary Examiner* — Andrew Sasinowski
(74) *Attorney, Agent, or Firm* — Lee, Hong, Degerman, Kang & Waimey

(57) ABSTRACT

A display method in a mobile terminal includes displaying a plurality of menu items on a display of the mobile terminal, such that each of the plurality of menu items corresponds to a different function that is executable at the mobile terminal. Further operations include selecting a first menu item and a second menu item from the plurality of menu items, the selecting occurs responsive to user input, and displaying a first screen on the display, the first screen relating to the function that corresponds to the selected first menu item. Additional features include displaying first data and second data in the first screen, the first data being data that is associated with the function that corresponds to the selected first menu item, and the second data being data that is associated with the function that corresponds to the selected second menu item.

20 Claims, 49 Drawing Sheets

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Application No. 10-2011-0040911 filed on Apr. 29, 2011, the contents of which are hereby incorporated by reference herein in its entirety.

FIELD OF THE INVENTION

The present invention generally relates to a mobile terminal, and in particular, to a mobile terminal in which two or more menus are combined for display.

DISCUSSION OF THE RELATED ART

As hardware technology and software technology related to various electronic devices, comprising mobile terminals, are moving ahead by leaps and bounds, the electronic devices can now provide or store a variety of functions and pieces of information. In general, the variety of functions and the pieces of information are provided in the form of applications.

The variety of functions and the pieces of information are commonly provided in the form of independent applications. Accordingly, in order to use the functions separately provided as different applications at the same time, a complicated menu manipulation process is often implemented or in other cases display screens will need to be frequently switched. Accordingly, there is a need for improvement for such menus.

SUMMARY

In accordance with one embodiment, a display method in a mobile terminal includes displaying a plurality of menu items on a display of the mobile terminal, such that each of the plurality of menu items corresponds to a different function that is executable at the mobile terminal. Further operations include selecting a first menu item and a second menu item from the plurality of menu items, the selecting occurs responsive to user input, and displaying a first screen on the display, the first screen relating to the function that corresponds to the selected first menu item. Additional features include displaying first data and second data in the first screen, the first data being data that is associated with the function that corresponds to the selected first menu item, and the second data being data that is associated with the function that corresponds to the selected second menu item.

In accordance with another embodiment, a mobile terminal includes a memory configured to store menu data for a plurality of menu items wherein each of the plurality of menu items corresponds to a different function that is executable at the mobile terminal; a display configured to display the plurality of menu items; and a controller configured to: select a first menu item and a second menu item from the plurality of menu items, wherein the selecting occurs responsive to user input; control the display to display a first screen, the first screen relating to the function that corresponds to the selected first menu item; and control the display to display first data and second data in the first screen, the first data being data that is associated with the function that corresponds to the selected first menu item, and the second data being data that is associated with the function that corresponds to the selected second menu item.

In accordance with another embodiment, a display method in a mobile terminal includes displaying a plurality of menu items on a touch screen display of the mobile terminal, wherein each of the plurality of menu items corresponds to a different application that is executable at the mobile terminal; selecting a first menu item and a second menu item from the plurality of menu items, wherein the selecting occurs responsive to user touch input received at the touch screen display; executing a first application that corresponds to the selected first menu item, wherein the executing of the first application causes displaying simultaneously of first data and second data in a first screen, the first data being data that is associated with the selected first menu item, and the second data being data that is associated with the application that corresponds to the selected second menu item; and executing a second application that corresponds to the selected second menu item in response to user selection of a particular item of the second data displayed in the first screen, wherein the executing of the second application causes displaying of a second screen on the display, wherein the second screen relates to the second application.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal according to some embodiments is described in detail below with reference to the accompanying drawings. It is to be noted that the suffixes of various components used in the following description, such as "module" and "unit," are used for ease of reference to such parts, but it is understood that such terms are not particularly given importance and roles.

A mobile terminal described in this document may be applicable to various types of terminals such as, for example, mobile phones, smart phones, notebook computers, digital broadcast terminals, personal digital assistants (PDA), portable multimedia players (PMP), navigators, and the like.

Figure 1:
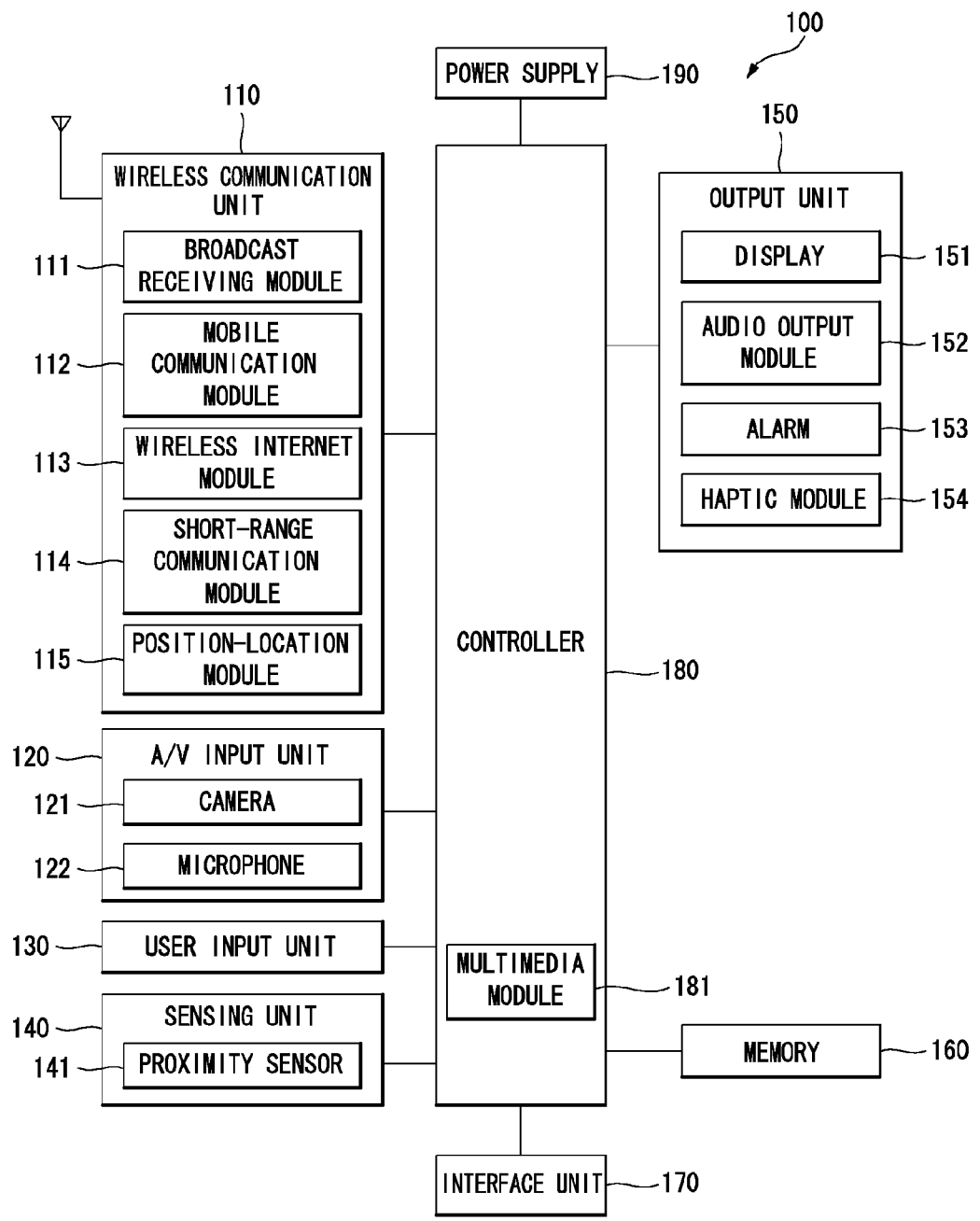
FIG. 1 is a block diagram of a mobile terminal according to an embodiment.

FIG. 1 is a block diagram of a mobile terminal in accordance with various embodiments. The mobile terminal 100 comprises a wireless communication unit 110, an audio/video (A/V) input unit 120, a user input unit 130, a sensing unit 140, an output unit 150, a memory 160, an interface unit 170, a controller 180, and a power supply 190. It is to be noted that the elements shown in FIG. 1 are not necessarily required features and that the terminal may include greater or fewer elements.

The wireless communication unit 110 may be configured with one or more modules. The wireless communication unit 110 may comprise a broadcast receiving module 111, a mobile communication module 112, a wireless Internet module 113, a short-range communication module 114, and a position-location module 115.

The broadcast receiving module 111 may receive a broadcast signal and/or broadcast associated information from an external broadcast managing entity via a broadcast channel. The broadcast channel may include a satellite channel and a terrestrial channel. The broadcasting managing entity may be a server for generating and sending broadcast signals or broadcast associated information or both or a server for receiving previously generated broadcast signals or broadcast associated information or both and sending the broadcast signals or the broadcast associated information or both to the mobile terminal. The broadcast signals may include not only TV broadcast signals, radio broadcast signals, and data broadcast signals, but also signals in the form of a combination of a TV broadcast signal or a radio broadcast signal and a data broadcast signal.

The broadcast associated information may be information about a broadcasting channel, a broadcasting program, or a broadcasting service provider. The broadcast associated information may be provided even over a mobile communication network. In the latter case, the broadcast associated information may be received by the mobile communication module 112.

Examples of the broadcast associated information may include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (Media-FLO®) and integrated services digital broadcast-terrestrial (ISDB-T). The receiving of multicast signals may also be provided. Data received by the broadcast receiving module 111 may be stored in the memory 160, for example.

The broadcast signals or the broadcast associated information or both which are received through the broadcast receiving module 111 may be stored in the memory 160.

The mobile communication module 112 sends and receives radio signals to and from at least one of a base station, an external terminal, and a server over a mobile communication network. The radio signals may include voice call signals, video telephony call signals, and various forms of data according to the transmission and reception of text and multimedia messages.

The wireless Internet module 113 refers to a module for wireless Internet access. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access).

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof. The position-location module 115 may relatively precisely calculate current 3-dimensional position information based on longitude, latitude and altitude by calculating distance information and precise time information from at least three satellites and then by applying triangulation to the calculated information. Pieces of location and time information may be calculated using three or more satellites, and errors of the pieces of calculated location position and time information may then be amended or changed using another satellite. The position-location module 115 may calculate speed information by continuously calculating a real-time current location.

Referring to FIG. 1, the audio/video (A/V) input unit 120 may provide audio or video signal input to the mobile terminal 100. The A/V input unit 120 may include a camera 121 and a microphone 122. The camera 121 processes image frames of still images or moving images obtained by an image sensor in a video telephony mode or a photographing mode. The processed image frames may be displayed on a display 151.

The image frames processed by the camera 121 may be stored in the memory 160 and/or sent to an external device through the wireless communication unit 110. The mobile terminal 100 may include two or more cameras 121, if desired.

The microphone 122 may receive an external audio while the mobile terminal is in a particular mode, such as a phone call mode, a recording mode or a voice recognition mode. The received audio may then be processed and converted into electrical audio data. In the call mode, the processed audio data may be converted into a form which may be transmitted to a mobile communication base station through the mobile communication module 112 and then output. The mobile terminal 100, and in particular the A/V input unit 120, may include a noise removing algorithm (or noise canceling algorithm) to remove noise generated in the course of receiving the external audio signal.

The user input unit 130 may generate input data responsive to user manipulation of an associated input device or devices. Examples of such devices may include a keypad, a dome switch, a touchpad (for example, static pressure/capacitance), a jog wheel and/or a jog switch, among others.

The sensing unit 140 may provide status measurements of various aspects of the mobile terminal 100. For example, the sensing unit 140 may detect an open/close status (or state) of the mobile terminal 100, a position of the mobile terminal 100, a presence or absence of user contact with the mobile terminal 100, an orientation of the mobile terminal 100, acceleration/deceleration of the mobile terminal 100, and combinations therefore, and generate a sense signal for controlling the operation of the mobile terminal 100. The mobile terminal 100 may be configured as a slide-type mobile terminal. In such a configuration, the sensing unit 140 may sense whether a sliding portion of the mobile terminal 100 is open or closed. The sensing unit 140 may also sense the presence or absence of power provided by the power supply 190, the presence or absence of a coupling or other connection between the interface unit 170 and an external device. In some cases, the sensing unit 140 may include a proximity sensor 141.

The output unit 150 may generate an output relevant to a sight sense, an auditory sense, or a tactile sense. The output unit 150 may include a display 151, an audio output module 152, an alarm 153, and a haptic module 154.

The display 151 may display (or output) information processed by the mobile terminal 100. For example, when the mobile terminal 100 is in the call mode, the display 151 may display a user interface (UI) or a graphic user interface (GUI) associated with the call. If the mobile terminal 100 is in the video telephony mode or the photographing mode, the display 151 may display a photographed or received image, a UI, or a GUI.

The display 151 may be formed using one or more of a liquid crystal display (LCD), a thin film transistor liquid crystal display (TFT LCD), an organic light-emitting diode (OLED), a flexible display, and a 3-dimensional display.

The display 151 may have a transparent or light-transmissive type configuration to enable an external environment to be seen therethrough. This may be called a transparent display. A transparent LCD may be an example of a transparent display. A backside structure of the display 151 may also have a light-transmissive type configuration. In this configuration, a user may see an object located behind the body of the mobile terminal through the area occupied by the display 151 of the body.

In a typical embodiment, at least two displays 151 may be included in the terminal. For example, a plurality of displays may be provided on a single face of the mobile terminal 100 by being built in one body or spaced apart from the single face. Alternatively, each of a plurality of displays may be provided on different faces of the mobile terminal 100.

If the display 151 and a sensor for detecting a touch action (also referred to herein as a "touch sensor") are constructed in a mutual-layered structure (also referred to herein as a "touch screen"), the display 151 may be used as an input device as well as an output device. For example, the touch sensor may include a touch film, a touch sheet, and a touchpad.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

Referring to FIG. 1, a proximity sensor 141 may be provided within the mobile terminal 100 enclosed by the touch screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include, for example, a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like.

If the touch screen is an electrostatic type, the proximity sensor 141 may detect proximity of a pointer using a variation of an electric field according to the proximity of the pointer. In this case, the touch screen (or touch sensor) may be classified as the proximity sensor.

For convenience of description, an action in which a pointer approaches the touch screen without contacting the touch screen will sometimes be referred to as a "proximity touch." An action in which a pointer actually touches the touch screen will sometimes be referred to a "contact touch." The location of the touch screen proximity-touched by the pointer may be the position of the pointer that vertically opposes the touch screen when the pointer performs the proximity touch.

The proximity sensor 141 may detect a proximity touch or a proximity touch pattern or both (for example, a proximity touch distance, a proximity touch duration, a proximity touch position, or a proximity touch shift state). Information corresponding to the detected proximity touch action or the detected proximity touch pattern or both may be outputted to the touch screen.

The audio output module 152 may output audio data that is received from the wireless communication unit 110 in a call signal reception mode, a call mode, a recording mode, a voice recognition mode, or a broadcast receiving mode. The audio output module 152 may output audio data stored in the memory 160. The audio output module 152 may output an audio signal relevant to a function (for example, a call signal receiving sound or a message receiving sound) performed by the mobile terminal 100. The audio output module 152 may include a receiver, a speaker, and a buzzer. The audio output module 152 may output audio through an earphone jack. A user may connect an earphone to the earphone jack and listen to the audio.

The alarm 153 may output a signal for informing an event generation of the mobile terminal 100. An event occurring in the mobile terminal 100 may include, for example, call signal reception, message reception, key signal input, and touch input. The alarm 153 may output a signal for informing an event generation by way of vibration as well as a video signal or an audio signal. The video or audio signal may be outputted via the display 151 or the audio output module 152.

The haptic module 154 may bring about various haptic effects that can be sensed by a user. Vibration is a representative example for the haptic effect brought about by the haptic module 154. Strength and patterns of the vibration generated from the haptic module 154 may be controllable. For example, vibrations differing from each other may be outputted in a manner of being synthesized together or may be sequentially outputted.

The haptic module 154 may generate various haptic effects, such as an effect caused by such a stimulus as a pin array vertically moving against a contact skin surface, the jet power of air via outlet, a suction power of air via inlet, a skim on a skin surface, a contact of an electrode, and an electrostatic power, or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger or an arm. Two or more haptic modules 154 may be provided according to a configuration of the mobile terminal 100.

The memory 160 may store a program for the operations of the controller 180. The memory 160 may temporarily store input/output data (for example, a phone book, messages, still pictures, and moving pictures). The memory 160 may store data of vibration and sound in various patterns outputted in case of a touch input to the touch screen.

The memory 160 may include at least one of flash memory, a hard disk, multimedia card micro type memory, card type memory (for example, SD or XD memory), random access memory (RAM), static random access memory (SRAM), read-only memory (ROM), electrically erasable programmable read-only memory, programmable read-only memory, magnetic memory, a magnetic disk, and an optical disk. The mobile terminal 100 may operate in association with a web storage that performs the storage function of the memory 160 on the Internet.

The interface unit 170 may play a role as a passage to external devices connected to the mobile terminal 100. The interface unit 170 may receive data from the external devices. The interface unit 170 may be supplied with power and then the power may be delivered to elements within the mobile terminal 100. The interface unit 170 may enable data to be transferred to external devices from the inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and the like.

The identity module may be a chip or card that stores various kinds of information for authenticating the use of the mobile terminal 100. The identify module may include a user identity module (UIM), a subscriber identity module (SIM), or a universal subscriber identity module (USIM). A device provided with the above identity module (hereafter referred to as an 'identity device') may be manufactured in the form of a smart card. The identity device may be connected to the mobile terminal 100 via the port.

The interface unit 170 may play a role as a passage for supplying power to the mobile terminal 100 from a cradle connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded onto the cradle.

The controller 180 may control the general operations of the mobile terminal 100, including those operations method set out in the following figures. For example, the controller 180 may perform control and processing relevant to a voice call, data communication, a video telephony and so on. The controller 180 may include a multimedia module 181 for playing multimedia. The multimedia module 181 may be implemented within the controller 180 or may be configured separately from the controller 180.

The controller 180 may perform pattern recognizing processing for recognizing a handwriting input performed on the touch screen as a character or recognizing a picture drawing input performed on the touch screen as an image.

The power supply 190 may receive external or internal power and then supply the power for the operations of the elements under control of the controller 180.

Various embodiments of this document described in the following description may be implemented in a recording medium that can be read by a computer or a computer-like device using software, hardware, or a combination of them.

According to hardware implementations, the embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions. In some cases, the embodiments may be implemented by the controller 180.

According to software implementations, embodiments, such as procedures or functions, may be implemented with separate software modules each of which may perform one or more of the functions and operations. Software codes may be implemented by a software application written in any suitable programming language. The software codes may be stored in memory, such as the memory 160, and executed by the controller 180.

Figure 2A:
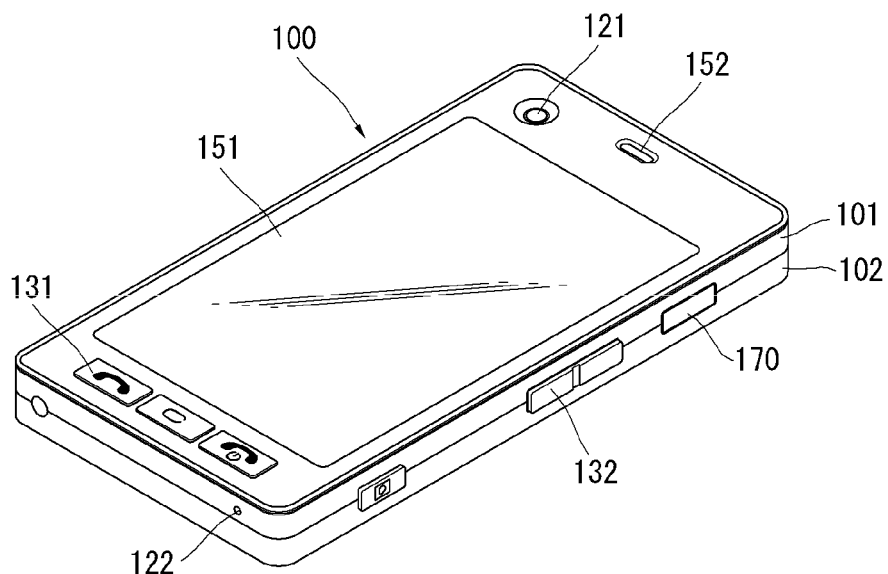
FIG. 2A is a front-view of a mobile terminal according to an embodiment.

FIG. 2A is a front-view of a mobile terminal according to an embodiment. However, this embodiment is not limited to the bar-type terminal body such teachings may also be applied to other terminal configurations. Examples of such configurations may include a folder-type, a slide-type, a bar-type, a rotational-type, a swing-type and/or combinations thereof.

The body may include a casing (or housing or cover) that forms the exterior of the terminal. The casing may be divided into a front casing 101 and a rear casing 102. Various electric/electronic parts may be provided in the space between the front casing 101 and the rear casing 102. A middle casing may be further provided between the front casing 101 and the rear casing 102.

The casings may be formed by injection molding of synthetic resin or may be formed of metal substance such as stainless steel (STS), titanium (Ti) or the like, for example.

The display 151, the audio output module 152, the camera 121, user input units 130/131/132, the microphone 122, the interface unit 170 and the like may be provided on the terminal body, and more particularly on the front casing 101.

The display 151 may occupy most of the main face of the front casing 101. The audio output module 152 and the camera 121 may be provided at an area adjacent to one end portion of the display 151, while the user input unit 131 and the microphone 122 may be provided at the other area adjacent to the other end portion of the display 151. The user input unit 132 and the interface unit 170 may be provided on lateral sides of the front and rear casings 101 and 102.

The user input unit 130 may receive a command for controlling the operation of the mobile terminal 100. The user input unit 130 may include a plurality of manipulating units 131 and 132. The manipulating units 131 and 132 may be generally called a manipulating portion and they may adopt any mechanism of a tactile manner that enables a user to perform a manipulation action by experiencing a tactile feeling.

The contents inputted by the first manipulating unit 131 or the second manipulating unit 132 may be diversely set. For example, commands, such as the start, the end and scroll, may be inputted to the first manipulating unit 131. A command for a volume adjustment of sound outputted from the audio output module 152, a command for switching into a touch recognizing mode of the display 151 and so on may be inputted to the second manipulating unit 132.

Figure 2B:
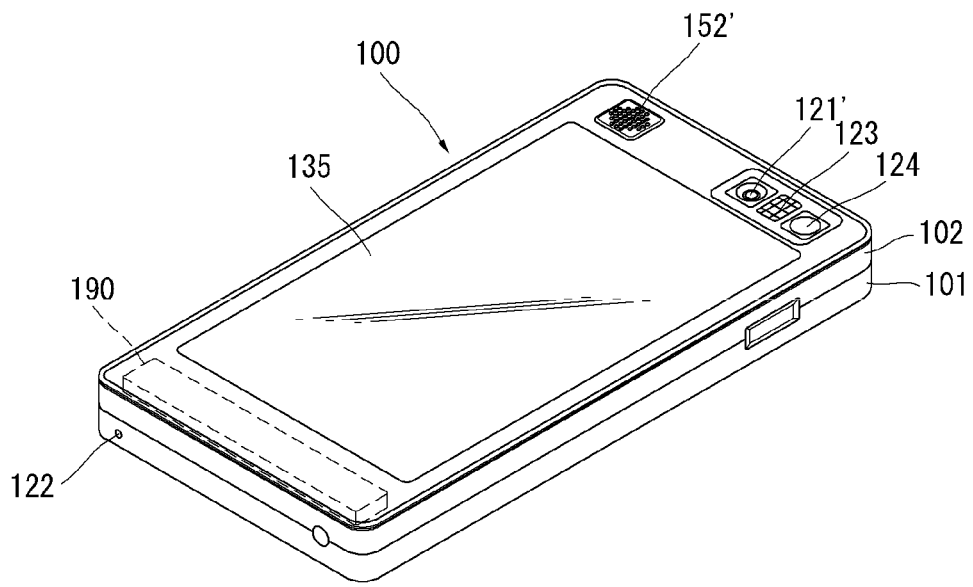
FIG. 2B is a perspective view of a backside of the mobile terminal shown in FIG. 2A.

FIG. 2B is a perspective diagram of a backside of the mobile terminal shown in FIG. 2A.

Referring to FIG. 2B, a camera 121' may be additionally provided on a backside of the terminal body, and more particularly on the rear casing 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in casing of photographing the subject using the camera 121'. If a user attempts to take a picture of the user (self-photography) using the camera 121', the mirror 124 may enable the user to view a user's face reflected by the mirror 124.

An audio output module 152' may be additionally provided on the backside of the terminal body. The additional audio output module 152' may implement a stereo function together with the audio output module 152 shown in FIG. 2A and may be used for implementation of a speakerphone mode in talking over the terminal.

A broadcast signal receiving antenna 124 may be additionally provided at the lateral side of the terminal body as well as an antenna for communication or the like. The antenna 124 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body. A touchpad 135 for detecting a touch may be additionally provided on the rear casing 102.

The touchpad 135 may be configured in a light-transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear casing 102.

The touchpad 135 may be activated by interconnecting with the display 151 of the front casing 101. The touchpad 135 may be provided in rear of the display 151 in parallel to one another. The touchpad 135 may have a size equal to or less than a size of the display 151.

Interconnected operational mechanism between the display 151 and the touchpad 135 may now be explained with reference to FIGS. 3A and 3B.

Figure 3A:
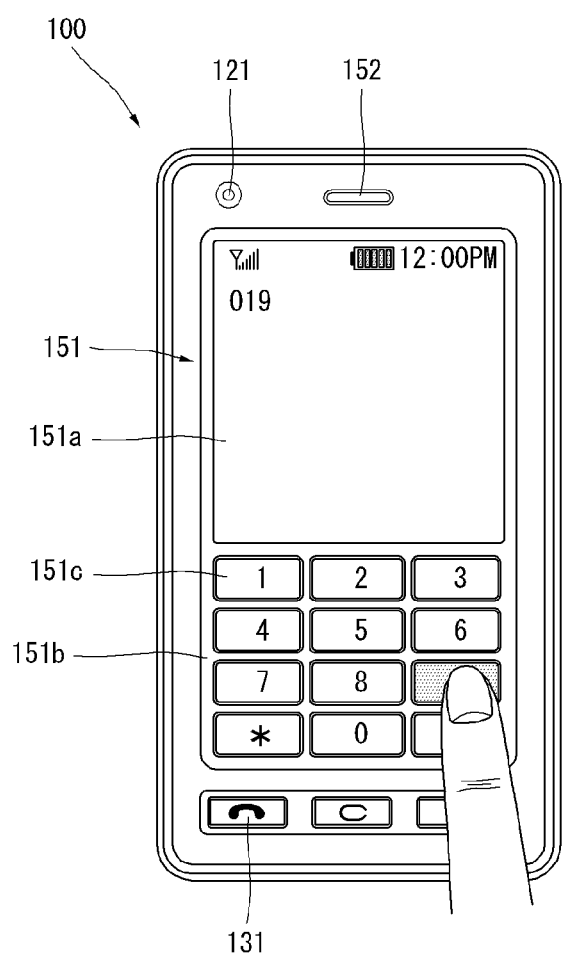
FIGS. 3A and 3B are front-views of a mobile terminal according to an embodiment.
Figure 3B:
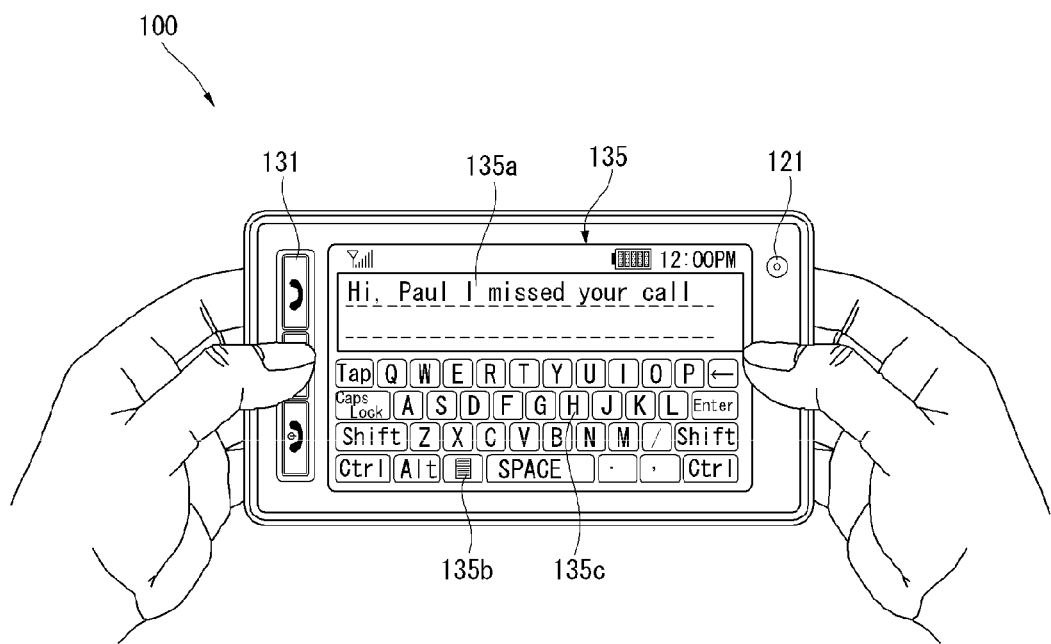

FIGS. 3A and 3B are front-views of a mobile terminal according to various embodiments. Various kinds of visual information may be displayed on the display 151. The displayed information may be characters, numerals, symbols, graphics, icons and/or the like. In order to input the information, at least one of the characters, numerals, symbols, graphics and icons may be represented as a single predetermined array to be implemented in a keypad formation. The keypad formation may be called soft keys.

FIG. 3A shows that an input touch may be applied to a soft key through a front face of a terminal body. The display 151 may be operable through an entire area or may be divided into a plurality of regions. The plurality of the regions may be configured to be interoperable.

An output window 151a may be displayed on a top portion of the display 151 and an input window 151b may be displayed on a bottom portion of the display 151. A soft key 151c representing a digit for inputting a phone number or the like may be output to the input window 151b. When the soft key 151c is touched, a digit corresponding to the touched soft key may be outputted to the output window 151a. When the first manipulating unit 131 is manipulated, a call connection for a phone number displayed on the output window 151a may be attempted.

FIG. 3B shows that an input touch may be applied to a soft key through a rear face of a terminal body. FIG. 3A shows that the terminal body can be vertically arranged (i.e., in a portrait manner). FIG. 3B shows that the terminal body can be horizontally arranged (i.e., in a landscape manner). The display 151 may change an output picture according to the arranged direction of the terminal body.

FIG. 3B also shows that a text input mode is activated in the mobile terminal 100. FIG. 3B shows that the touch screen 135 may include an output window 135a and an input window 135b. The output window 135a and the input window 135b may be displayed on the display 151. A plurality of soft keys 135c representing characters, symbols and/or digits may be arranged in the input window 135b. The soft keys 135c may be arranged in a QWERTY key formation.

When the soft keys 135c are touched using the touchpad 135, the characters, symbols and/or digits corresponding to the touched soft keys may be outputted to the output window 135a. Touch input via the touchpad 135 may be advantageous in that the soft keys 135c may be prevented from being blocked by a finger in casing of touch, which is compared to the touch input via the display 151. If the display 151 and the touchpad 135 are transparent, the mobile terminal 100 may visually check or determine whether fingers are located at the backside of the terminal body. Hence, more correct touch inputs may be made.

The display 151 or the touchpad 135 or both may receive a touch input by scrolling as well as the input methods disclosed in the above embodiments. A user may scroll the display 151 or the touchpad 135 to shift a cursor or pointer located at an entity (for example, icon or the like) displayed on the display 151. When a finger is shifted on the display 151 or the touchpad 135, a path of the shifted finger may be visually displayed on the display 151. This may be useful in editing an image displayed on the display 151.

If both the display (or the touch screen) 151 and the touchpad 135 are touched together within a predetermined amount of time (e.g., a threshold amount of time), a particular function of the mobile terminal 100 can be executed. The simultaneous touch may correspond to a casing that the terminal body is held by a user using a thumb and a first finger (clamping). The function may include activation or deactivation for the display 151 or the touchpad 135.

Figure 4:
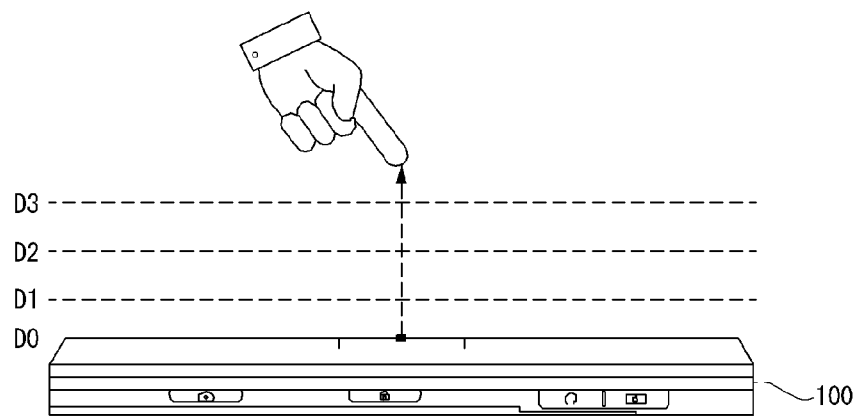
FIG. 4 is a diagram relating to a proximity depth of a proximity sensor.

The proximity sensor 141 described above is now described in detail with reference to FIG. 4. FIG. 4 is a diagram relating to a proximity depth of a proximity sensor. As shown in FIG. 4, when a pointer, such as a user's finger, a pen, a stylus and the like, approaches the touch screen, the proximity sensor 141 provided within or in a vicinity of the touch screen may detect the approach of the pointer and then output a proximity signal.

The proximity sensor 141 may output a different proximity signal according to a distance between the pointer and the proximity-touched touch screen (also referred as a proximity depth).

A distance from which a proximity signal is outputted when a point approaches the touch screen, may be referred to as a detection distance. The proximity depth can be known by comparing proximity signals outputted from proximity sensors with different detection distances.

FIG. 4 shows a cross-section of the touch screen provided with a proximity sensor capable of detecting three proximity depths, for example. A proximity sensor that identifies less than 3 proximity depths or more than 4 proximity depths may also be implemented.

If the pointer fully contacts the touch screen (d0), a contact touch may be recognized. If pointer is spaced away from the touch screen by a distance less than d1, a proximity touch to a first proximity depth may be recognized. If the pointer is spaced away from the touch screen by a distance between d1 and d2, a proximity touch to a second proximity depth may be recognized. If the pointer is spaced away from the touch screen in a distance less than d3 or equal to or greater than d2, a proximity touch to a third proximity depth may be recognized. If the pointer is spaced away from the touch screen in a distance equal to or greater than d3, a proximity touch is released.

The controller 180 may recognize the proximity touch as one of various input signals according to proximity depth and position of the pointer. The controller 180 may perform various operation controls according to various input signals.

Consider now the embodiment in which display 151 is implemented as a touch screen. As described above, the touch screen 151 may perform both the information display function and the information input function. However, the embodiments presented herein are not limited thereto, and the touch feature may include both contact touch and proximity touch.

Figure 5:
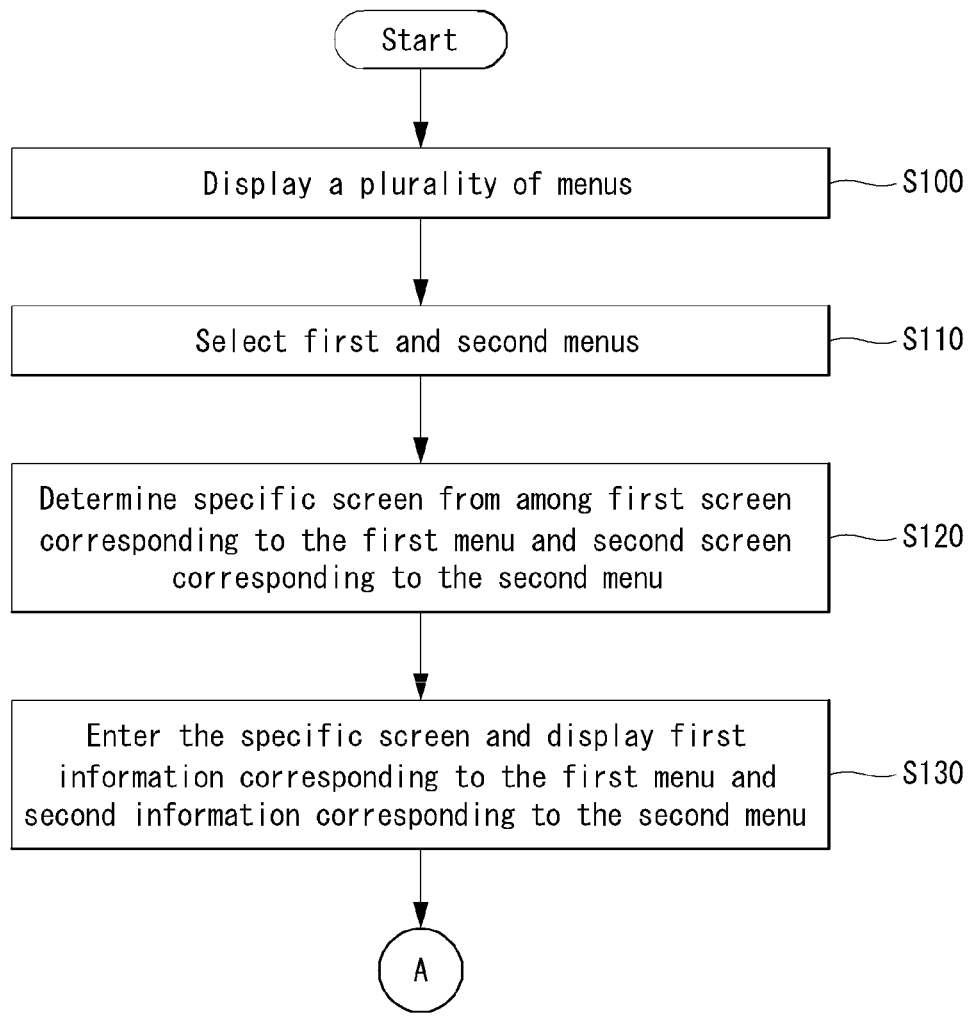
FIG. 5 is a flowchart illustrating a method of controlling the mobile terminal according to an embodiment of the invention.

FIG. 5 is a flowchart illustrating a method of controlling the mobile terminal (e.g., terminal 100) according to an embodiment of the invention, and FIGS. 6 to 11 are diagrams illustrating such an embodiment. Referring to FIG. 5, the controller 180 may display a plurality of menus in the touch screen 151 block S100.

The plurality of menus may be stored in the memory 160. The plurality of menus may correspond to a plurality of different applications (comprising content) or functions. The plurality of menus may be displayed in the form of text or a graphic object, such as an icon.

Figure 6:
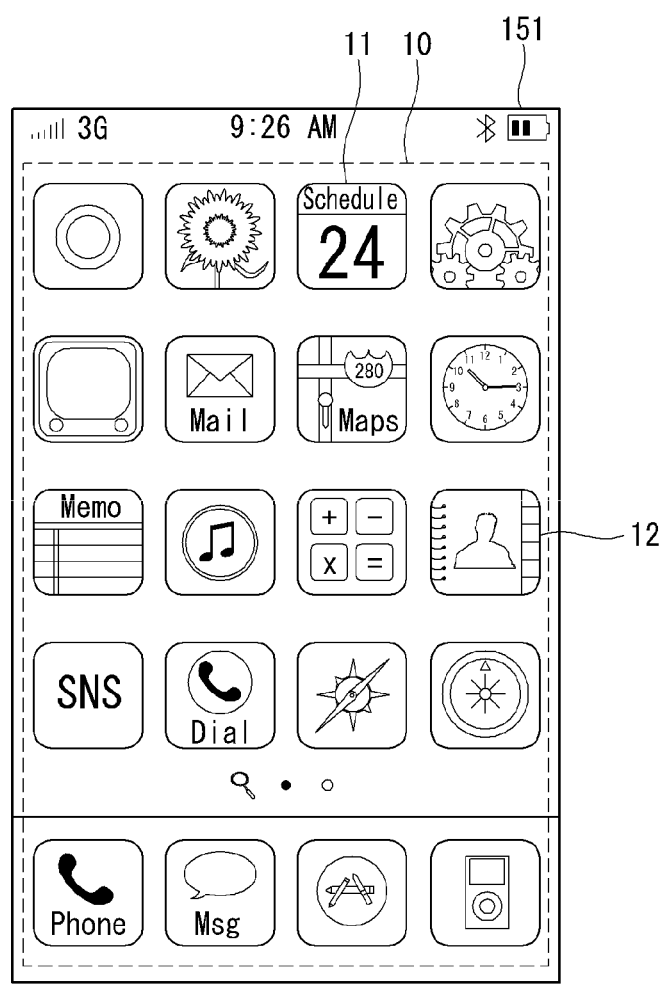
FIGS. 6 to 11 are diagrams illustrating the method of controlling the mobile terminal according to the first embodiment of the invention.

FIG. 6 shows an example in which block S100 has been implemented. The controller 180 may make iconic a plurality of menus 10 (also referred to herein as menu items) corresponding to a plurality of different applications and/or functions and display them on the touch screen 151.

The controller 180 may receive a selection signal for first and second menus from among the plurality of menus 10 block S110.

Figure 7:
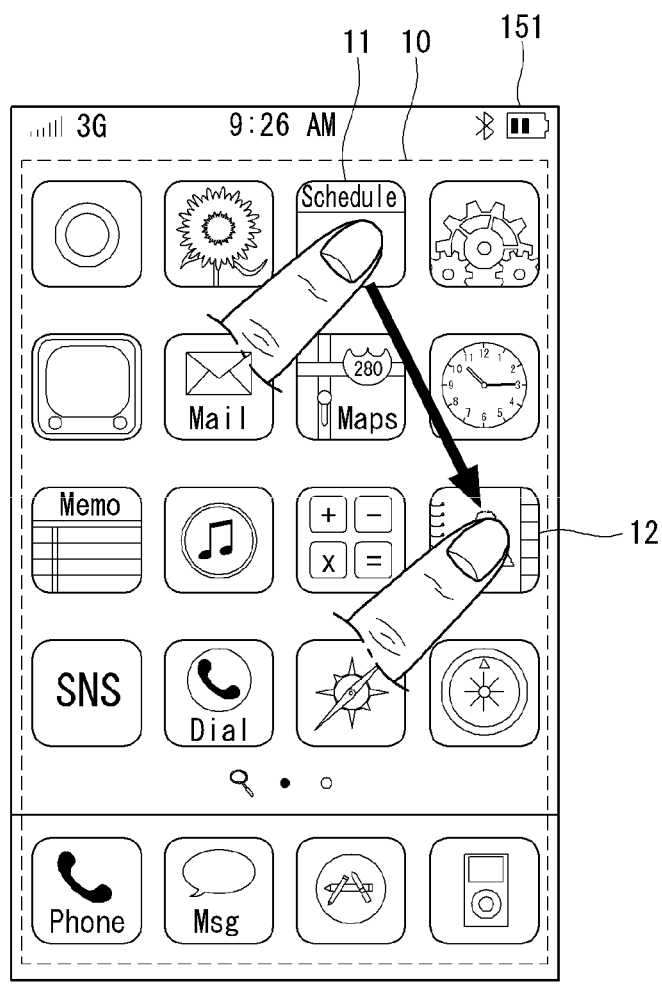

The function of block S110 may be implemented in various forms. For example, referring to FIG. 7, a user may touch a first menu 11 from among the plurality of menus 10 and move the touch to a second menu 12. When the touch movement from the first menu 11 to the second menu 12 is detected, the controller 180 may recognize that the first menu 11 and the second menu 12 have been selected. As shown in FIGS. 6 and 7, the first menu 11 may correspond to a schedule application, and the second menu 12 may correspond to a phone book phone book (or a contact book). Various other embodiments in which block S110 is implemented will be described later.

When the selection signal is received, the controller 180 may determine a specific screen from among a first screen corresponding to the first menu 11 and a second screen corresponding to the second menu 12 block S120. For example, the first screen corresponding to the first menu 11 may be a schedule screen provided by a schedule application, and the second screen corresponding to the second menu 12 may be a phone book screen. For example, referring to FIG. 7, since the touch movement has stopped at the second menu 12, the controller 180 may determine the second screen, corresponding to the second menu 12, as the specific screen. On the other hand, the controller 180 may determine the first screen, corresponding to the first menu 11 of the start point of the touch movement, as the specific screen. Various other embodiments regarding the method of determining the specific screen at block S120 will be described later.

The controller 180 may enter the specific screen and display first information, corresponding to the first menu, and second information, corresponding to the second menu, in the specific screen (block S130). For example, if the specific screen is determined as the phone book screen at block S120, the controller 180 may enter the phone book screen and display a phone book item list 20 (that is, second information corresponding to the second menu 12) and pieces of schedule information 21 (that is, first information corresponding to the first menu 11) in the phone book screen, as shown in FIG. 8.

Figure 8:
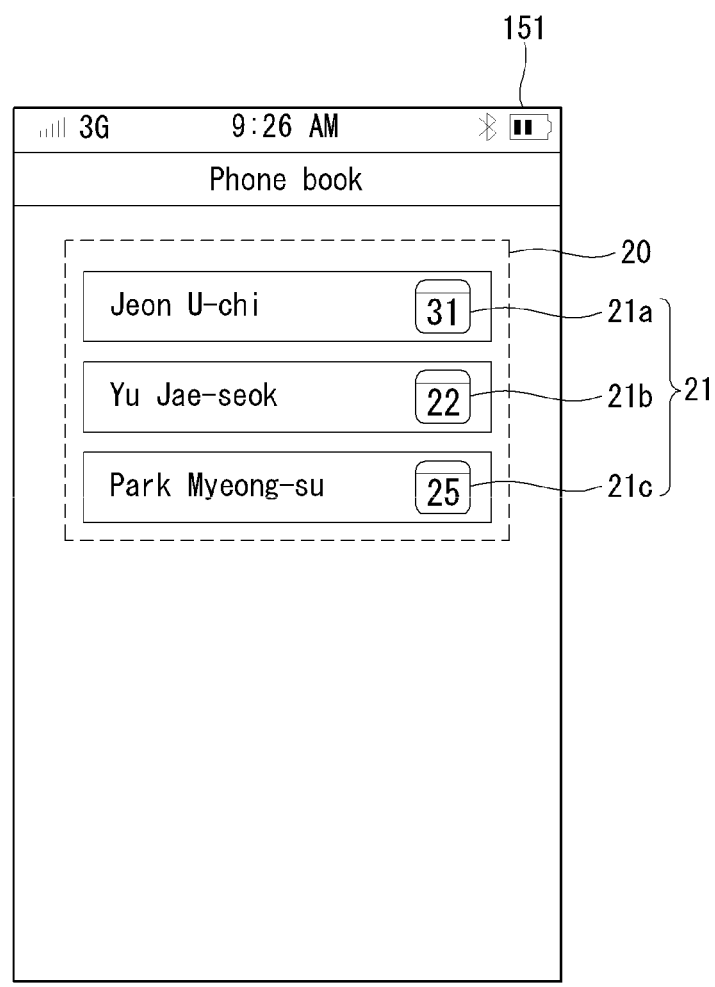

Here, the controller 180 may determine whether schedule information corresponding to phone book items included in the phone book item list 20 exists and display the pieces of schedule information 21 so that they correspond to the phone book items, as shown in FIG. 8.

For example, in FIG. 8, schedule information corresponding to "Jeon U-chi", "Yu Jae-seok", and "Park Myeong-su" (that is, the phone book items) exists in the schedule information managed by a schedule application. Accordingly, the controller 180 may display the pieces of schedule information 21 by incorporating the phone book items as shown in FIG. 8.

Referring still to FIG. 8, according some devices, the phone book screen may display only the phone book item list 20. However, such devices may additionally be configured to include the displaying of schedule information 21 together with the phone book item list 20. Accordingly, a feature for providing an ability to access a function, provided by the schedule application corresponding to the first menu 11, may be implemented. Note the scenario in which the phone book imports a schedule application, and in such as case a user may use both a function provided by the phone book, and another function provided by the schedule application, in the same phone book screen.

The first information and the second information may include text, content comprising still images and moving images, and menus and they may be displayed in various forms, such as an icon, thumbnail, widget, and a function region.

The function region refers to a region in which a function provided by a menu (corresponding to the schedule application in FIG. 8) corresponding to a screen different from a screen (the phone book screen in FIG. 8), determined as the specific screen from among the first screen and the second screen, can be used. The function region will be described in detail later with reference to relevant drawings. Various embodiments in which the first information and the second information are displayed in the specific screen, determined at blocks S120, S130 will be described later with reference to relevant drawings.

Figure 9:
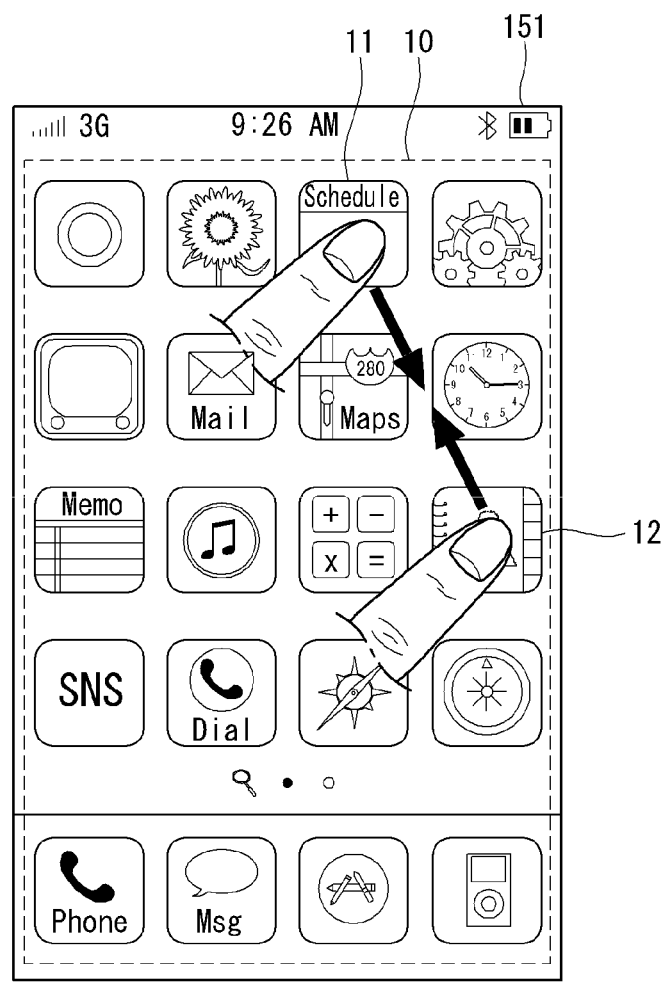

FIG. 9 is a diagram showing another example of block S110. In this example, a user may touch the first menu 11 and the second menu 12 using two fingers (corresponding to a multi-touch operation) and then perform an operation of making narrower the two fingers. When the operation of making narrower the two fingers is received, the controller 180 may select the first menu 11 and the second menu 12.

Figure 10:
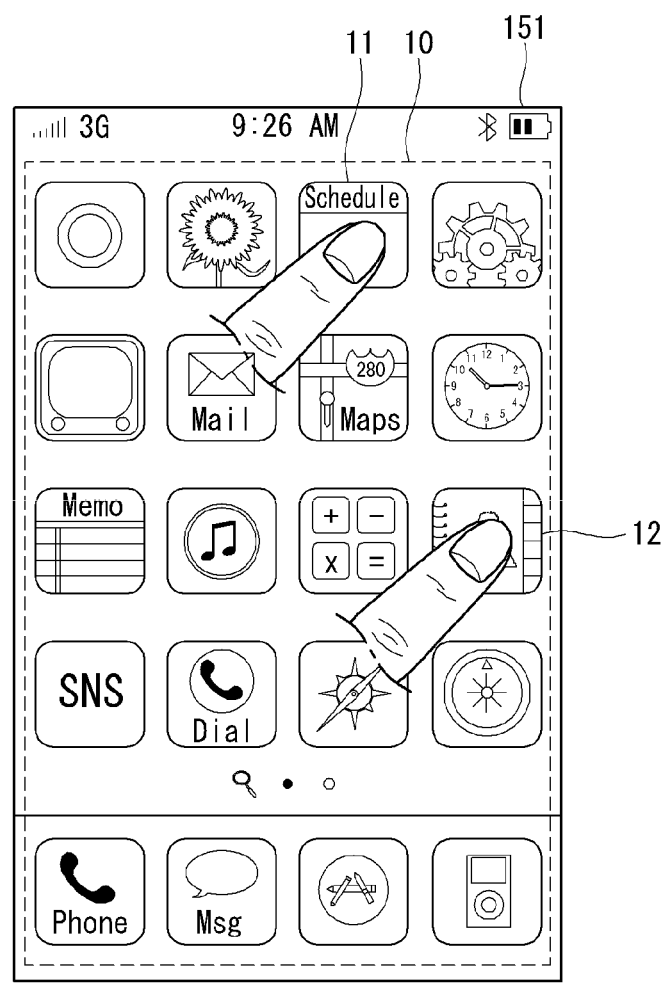

FIG. 10 is a diagram showing yet another example of the block S110, and in this example, a user may touch the first menu 11 and the second menu 12 using two fingers (corresponding to a multi-touch operation) and maintain the touches for a certain period of time. Furthermore, FIG. 10 may be described as an operation of a user twice touching the first menu 11 and the second menu 12 using two fingers, respectively, at the same time. If each of the touches is maintained for a predetermined or threshold time or more, the controller 180 may select the first menu 11 and the second menu 12.

Meanwhile, in the embodiments shown in FIGS. 9 and 10, for example, it may be useful to discuss how to determine which one of the first menu 11 and the second menu 12 as a main menu and to determine which one of the first menu 11 and the second menu 12 as a sub-menu. A screen corresponding to a menu determined as the main menu, from among the first menu 11 and the second menu 12, is determined as the specific screen at block S120, for example.

If block S110 is performed as shown in FIGS. 9 and 10, the controller 180 may determine the main menu as previously determined. For example, the memory 160 may store a database comprising pieces of information regarding which menu will be determined as the main menu according to various combinations of menus in order to perform a certain function. For example, if the schedule application 11 and the phone book 12 are selected, the database may include a matching relationship in which the phone book 12 is determined as the main menu (corresponding to the case of FIG. 8). As another example, if the schedule application 11 and the phone book 12 are selected, the database may include a matching relationship in which the schedule application 11 is determined as the main menu.

Figure 11:
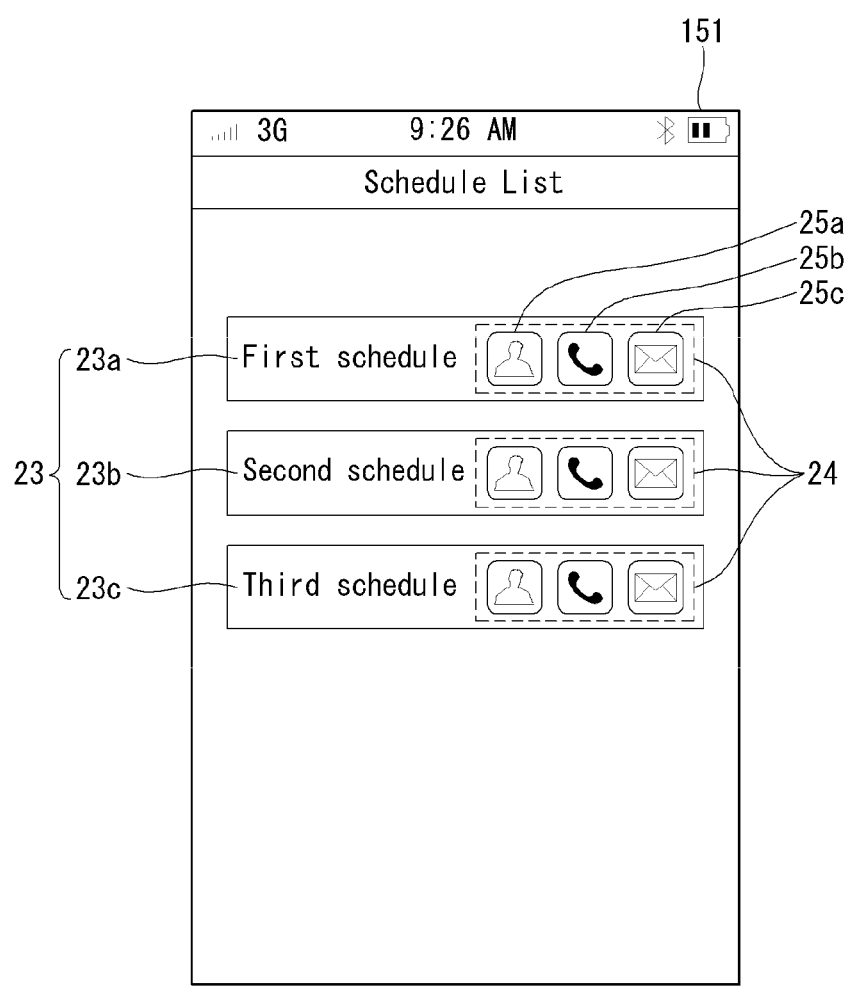

FIG. 11 is a diagram showing an example of a screen when the schedule application 11 is determined as the main menu at block S120. Referring to FIG. 11, the controller 180 may enter a screen corresponding to the schedule application 11 and display schedule information 23 provided by the schedule application 11 and, at the same time, display pieces of the information 24 to which functions provided by the phone book 12 have been allocated.

Figure 12:
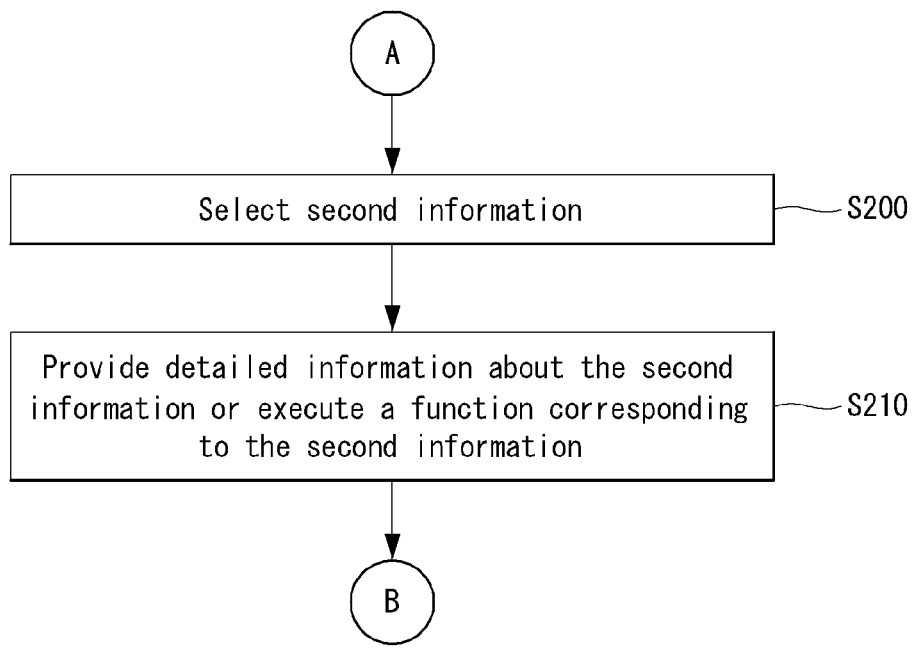
FIG. 12 is a flowchart illustrating a method of controlling the mobile terminal according to an another embodiment of the invention.
Figure 13:
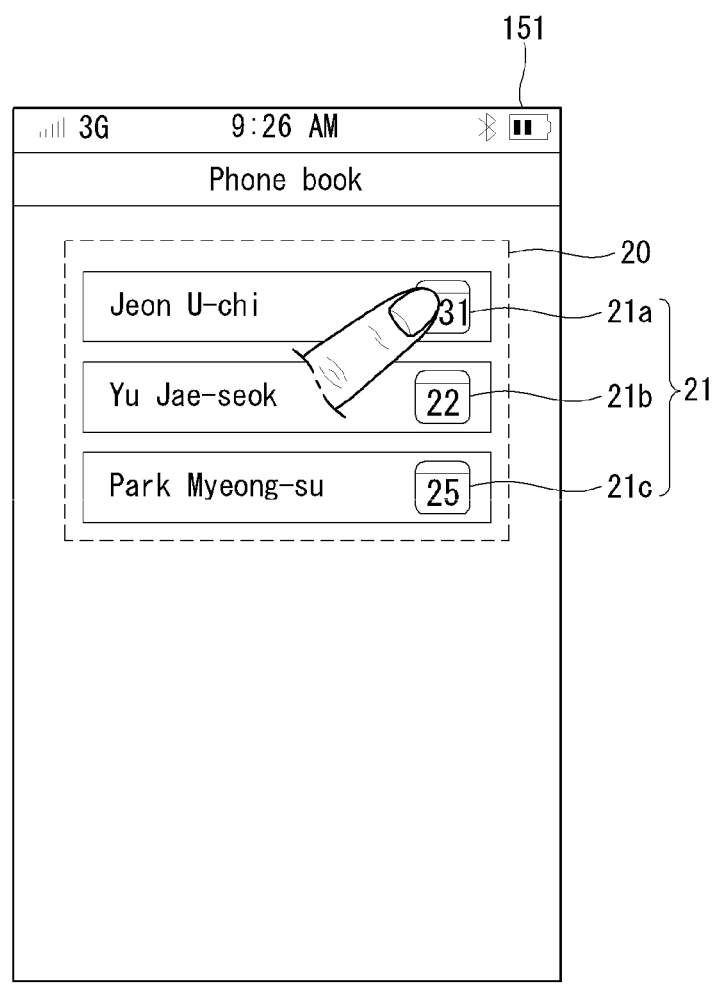
FIGS. 13 to 16 are diagrams illustrating the method of controlling the mobile terminal according to the embodiment of FIG. 12.

FIG. 12 is a flowchart illustrating a method of controlling the mobile terminal (e.g., mobile terminal 100) according to further embodiments of the invention, and FIGS. 13 to 16 are diagrams illustrating techniques for implements such embodiments. Note that in some scenarios, the previously described embodiment may be performed prior to, and in addition to, the embodiment set out in FIG. 12.

Recall that at block S130 of FIG. 5, it is considered that the first information is information corresponding to the main menu of the first menu and the second menu and the second information is information corresponding to the sub-menu thereof. As described above, a screen corresponding to the main menu corresponds to the specific screen may be determined block S120.

Referring to FIG. 12, the controller 180 may receive a selection signal for the second information (that is, information corresponding to the sub-menu) block S200. For example, referring to FIG. 13, a user may select schedule information 21*a* corresponding to a specific phone book item ("Jeon U-chi") from among pieces of schedule information 21 displayed in the phone book screen (that is, the screen corresponding to the main menu). When the second information is selected, the controller 180 may provide detailed information about the second information or may execute a function corresponding to the second information (block S210).

The function corresponding to the second information corresponds to a menu determined as the sub-menu from among the first menu and the second menu. For example, referring to FIG. 14, when the schedule information 21*a* corresponding to the specific phone book item ("Jeon U-chi" 27) is selected in FIG. 13, the controller 180 may provide a popup window 26, providing detailed information about the schedule information 21*a*, to the touch screen 151.

Figure 14:
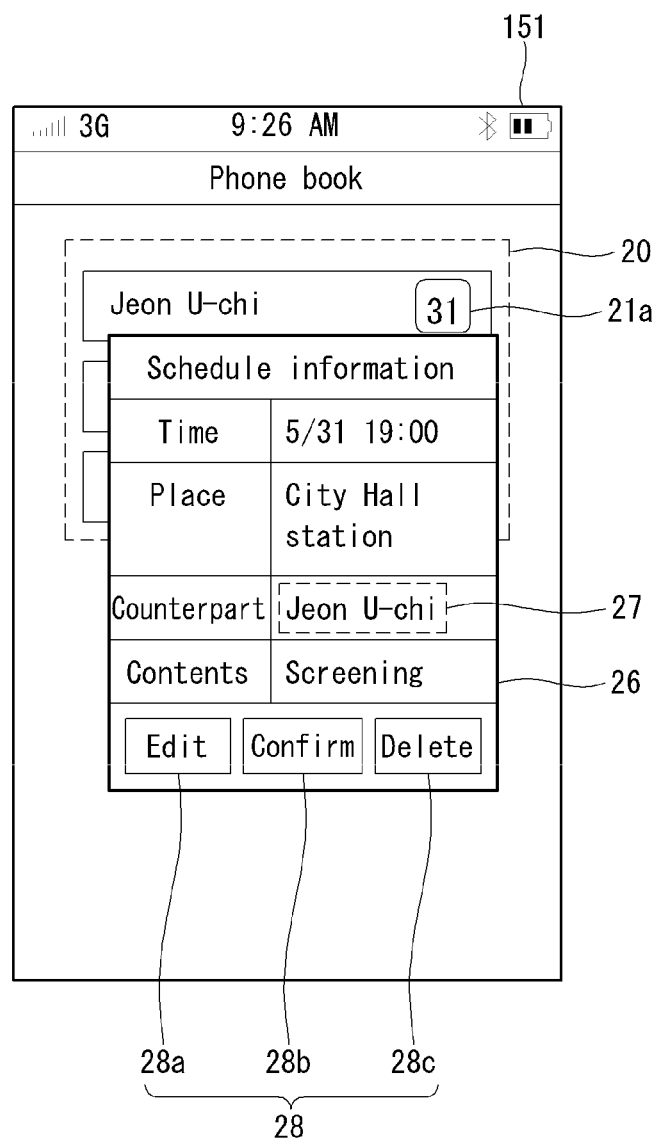

Furthermore, referring to FIG. 14, the controller 180 provides icons 28, provided by the schedule application and respectively corresponding to a schedule edition function 28*a*, a schedule check function 28*b*, and a schedule delete function 28*c*, so that a user can access the functions.

Figure 15:
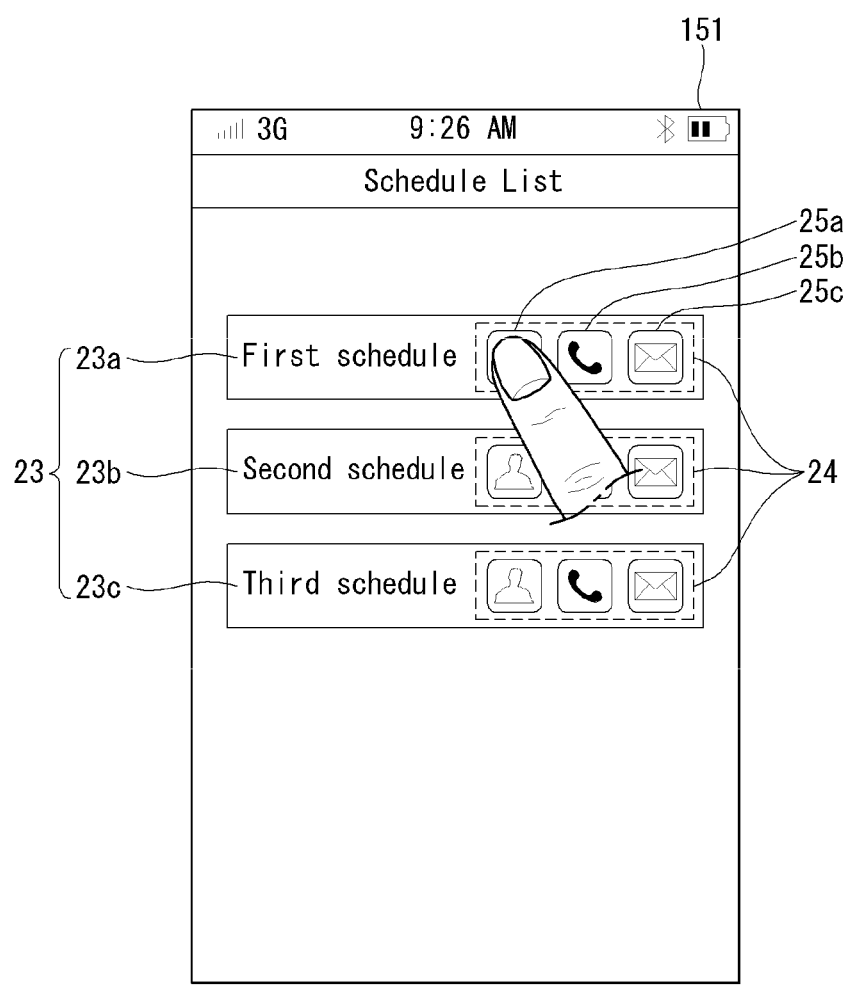
Figure 16:
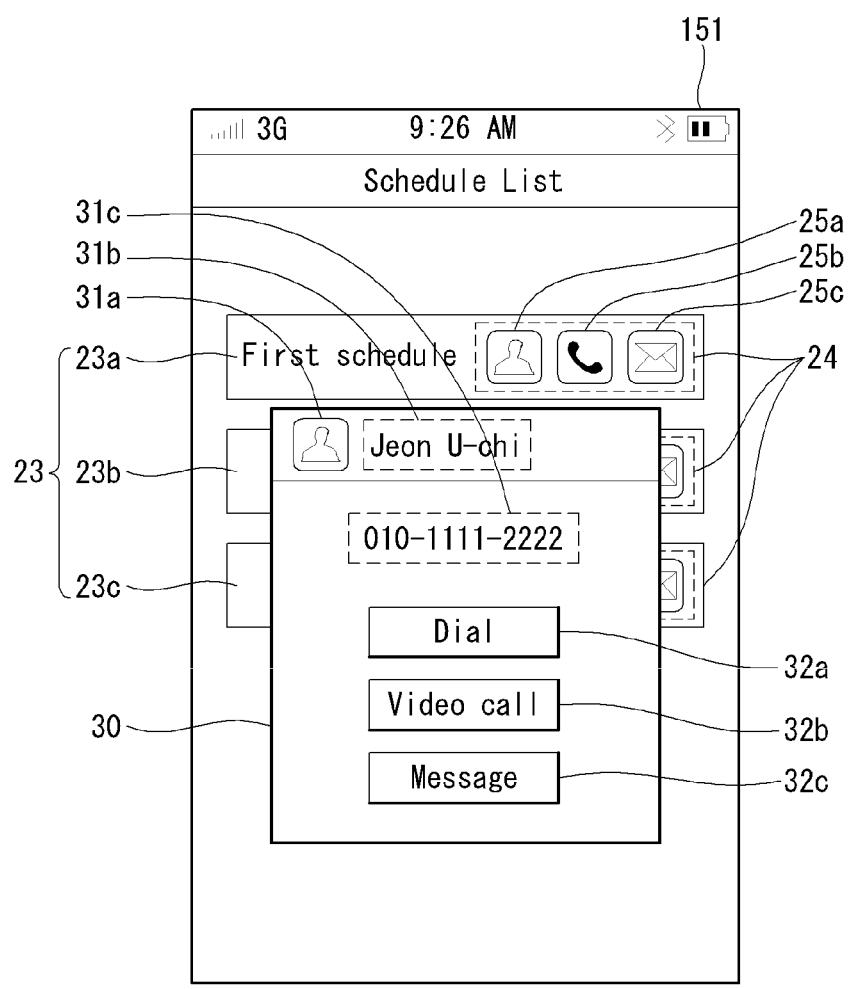

FIGS. 15 and 16 are diagrams showing examples in which the embodiment of FIG. 11 may be applied. In particular, a user may select information 25*a* to which a specific phone book-related function displayed based on specific schedule information 23*a* has been allocated, from among pieces of information 24 to which phone book-related functions displayed based on pieces of schedule information 23 have been allocated (block S200).

A function of displaying phone book information has been allocated to the information corresponding to reference numeral 25*a*, a function of dialing phone book items included in relevant schedule items (for example, 23*a*, 23*b*, and 23*c*) has been allocated to information corresponding to reference numeral 25*b*, and a function of sending a message to the phone book items included in the relevant schedule items (for example, 23*a*, 23*b*, and 23*c*) has been allocated to information corresponding to reference numeral 25*c*.

When the information corresponding to reference numeral 25*a* is selected, the controller 180 may provide a popup window 30, displaying phone book information about "Jeon U-chi" 31*b* (that is, a specific phone book item), to the touch screen 151 as shown in FIG. 16. This is an example of block S210 of FIG. 12.

The phone book information displayed in the popup window 30 may include an image 31a and telephone number 31c information corresponding to "Jeon U-chi" 31b. The popup window 30 may further include menus to which a dial function 32a, a video call function 32b, and a message send function 32c for a relevant telephone number have been allocated.

FIGS. 17 to 37 are diagrams illustrating various examples to which the foregoing embodiments may be implemented. Further description considers the scenario that the first menu (e.g., the main menu) and the second menu (e.g., the sub-menu) are selected by the touch movement (drag-and-drop) described at block S110 and a menu placed at the end of the touch movement is selected as the specific screen (corresponding to the main menu) at block S120.

Figure 17:
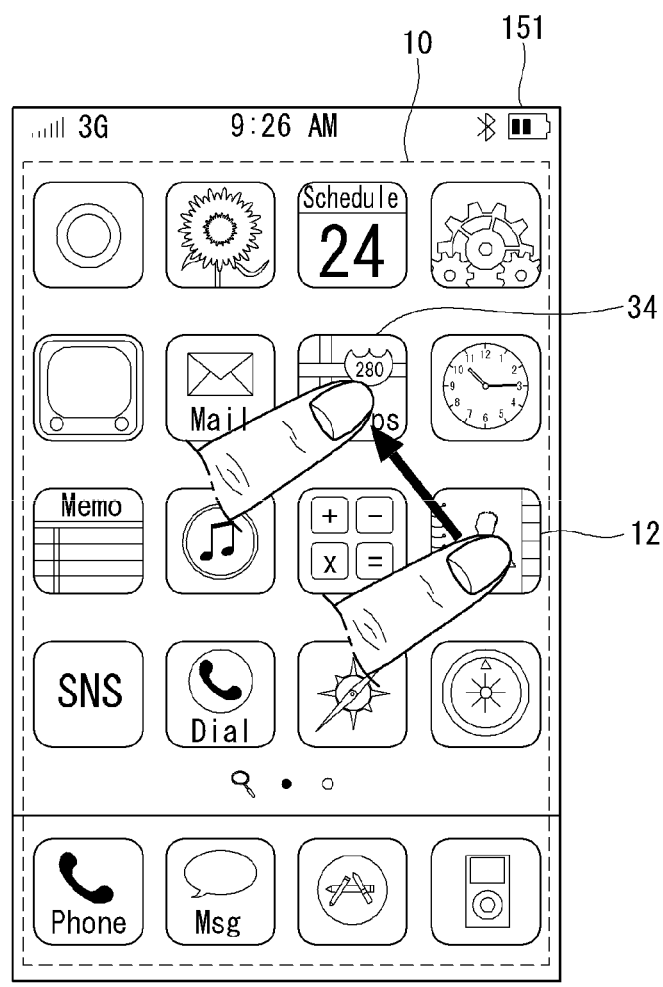
FIGS. 17 to 37 are diagrams illustrating examples to which various embodiments may be applied.

Referring to FIG. 17, a user may touch an icon 12 (corresponding to the second menu and the sub-menu) corresponding to a phone book and then move the touch to an icon 34 (corresponding to the first menu and the main menu) corresponding to a map application. An example of this occurs in blocks S100, S110 of FIG. 5.

Figure 18:
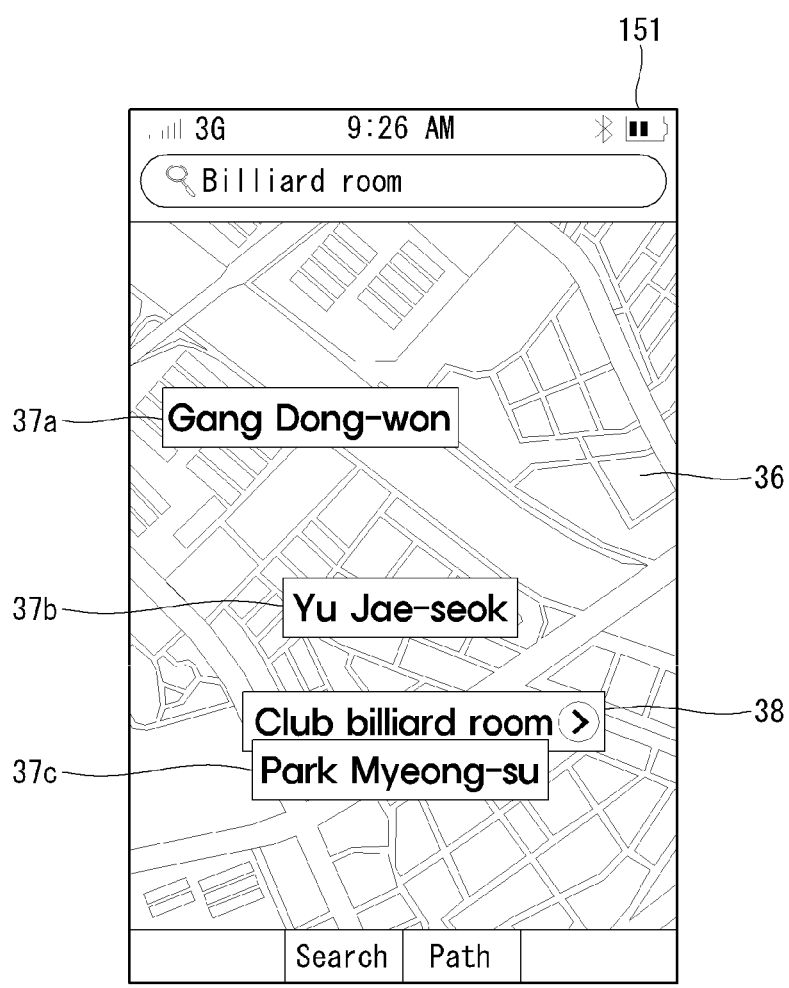

The controller 180 may determine the map application as the main menu (block S120), enter the map screen, and display map information 36, corresponding to the map application, and pieces of phone book information 37a, 37b, and 37c, corresponding to the phone book, in the map screen as shown in FIG. 18 (block S130 of FIG. 5).

Here, as shown in FIG. 18, the controller 180 may check the positions of persons 37a, 37b, and 37c whose positions can be checked, from among the phone book items included in the phone book, and display the checked positions in the map. Furthermore, the controller 180 may display position information 38 about the position of the person 37c, corresponding to a specific phone book item, in the map screen.

As described above, the controller 180 may enter the specific screen corresponding to the main menu and display a menu group, corresponding to at least one function or information provided by an application corresponding to the sub-menu, in the specific screen.

Here, as shown in FIGS. 17 and 18, the controller 180 may determine a position at which the menu group (for example, reference numerals 37a, 37b, and 37c in FIG. 18) will be displayed based on at least one of a kind of the first information (for example, map information 36) and a kind of the second information (for example, phone book information).

In FIG. 18, when a user selects a specific phone book item (for example, reference numerals 37a, 37b, and 37c) (block S200 of FIG. 12), the controller 180 may provide detailed information corresponding to the selected phone book item (block S210 of FIG. 12).

The detailed information, as described above, may be provided as a popup window in the map screen or may be switched into a phone book screen and provided with the execution of the map application remained.

Figure 19:
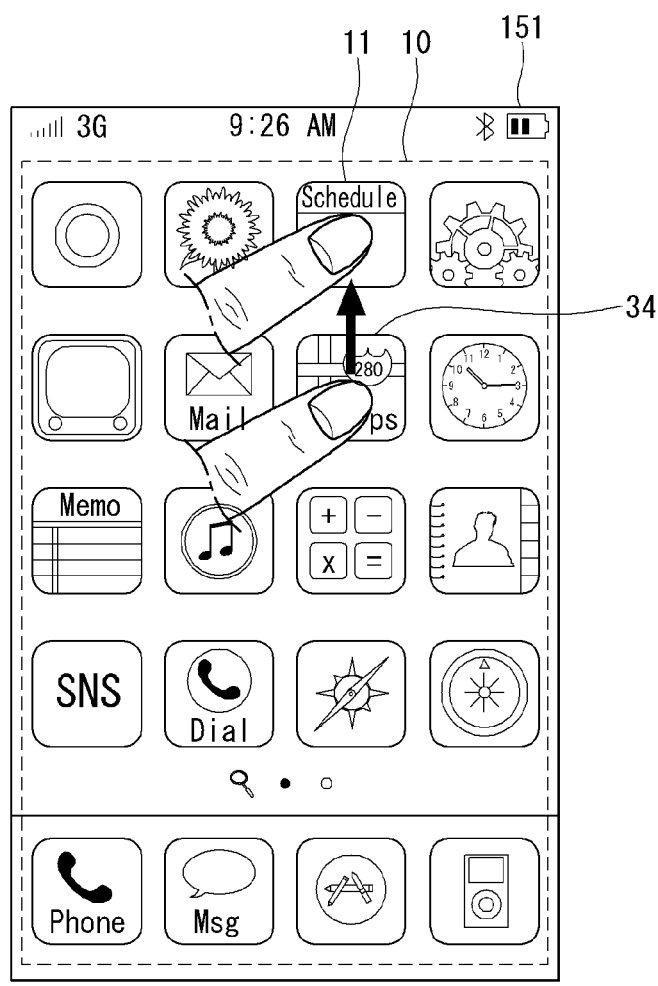

Referring to FIG. 19, a user may touch an icon 34 (corresponding to the second menu and the sub-menu) corresponding to a map application and move the touch to an icon 11 (corresponding to the first menu and the main menu) corresponding to a schedule application (blocks S100, S110 of FIG. 5).

Figure 20:
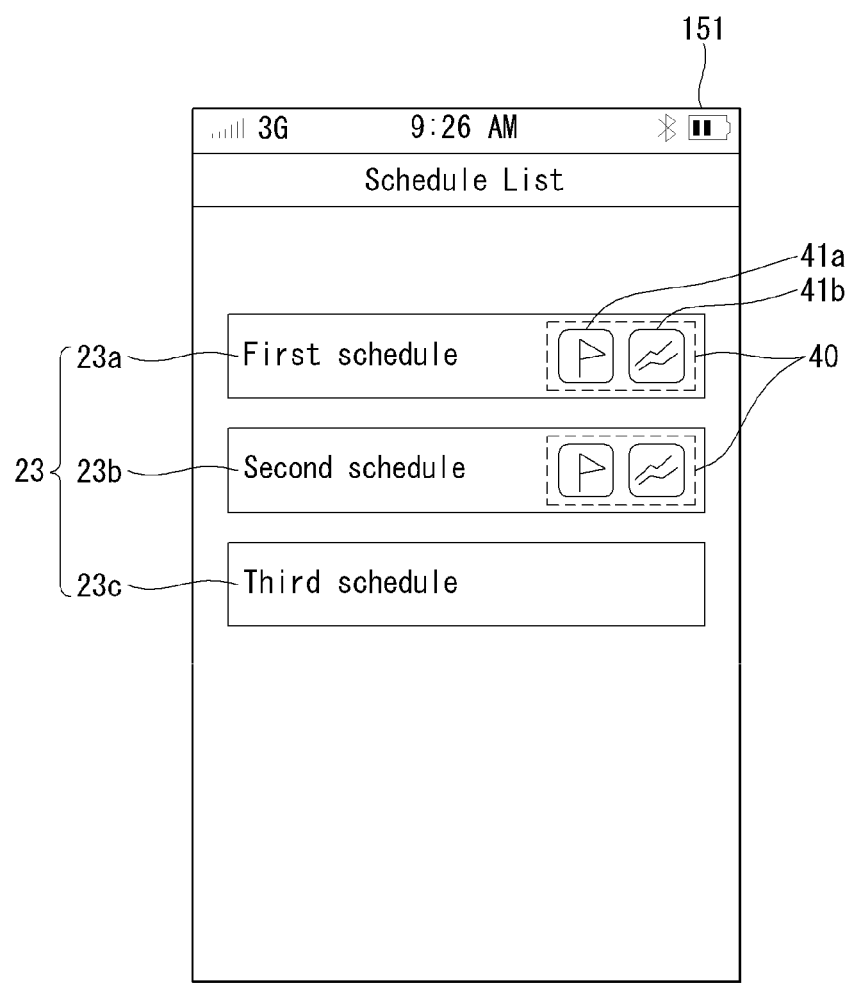

The controller 180 may determine the schedule application as the main menu (block S120 of FIG. 5), enter a schedule screen as shown in FIG. 20, and display pieces of schedule information 23, corresponding to the schedule application, and pieces of information 40, corresponding to the map application, in the map screen (block S130 of FIG. 5).

As described above, the pieces of information 40 corresponding to the map application do not necessarily relate to only content. That is, the pieces of information corresponding to the map application may include not only content, but also the ability to access functions provided by the map application. This technical characteristic may be applied to not only the map application, but also to other applications.

Figure 21:
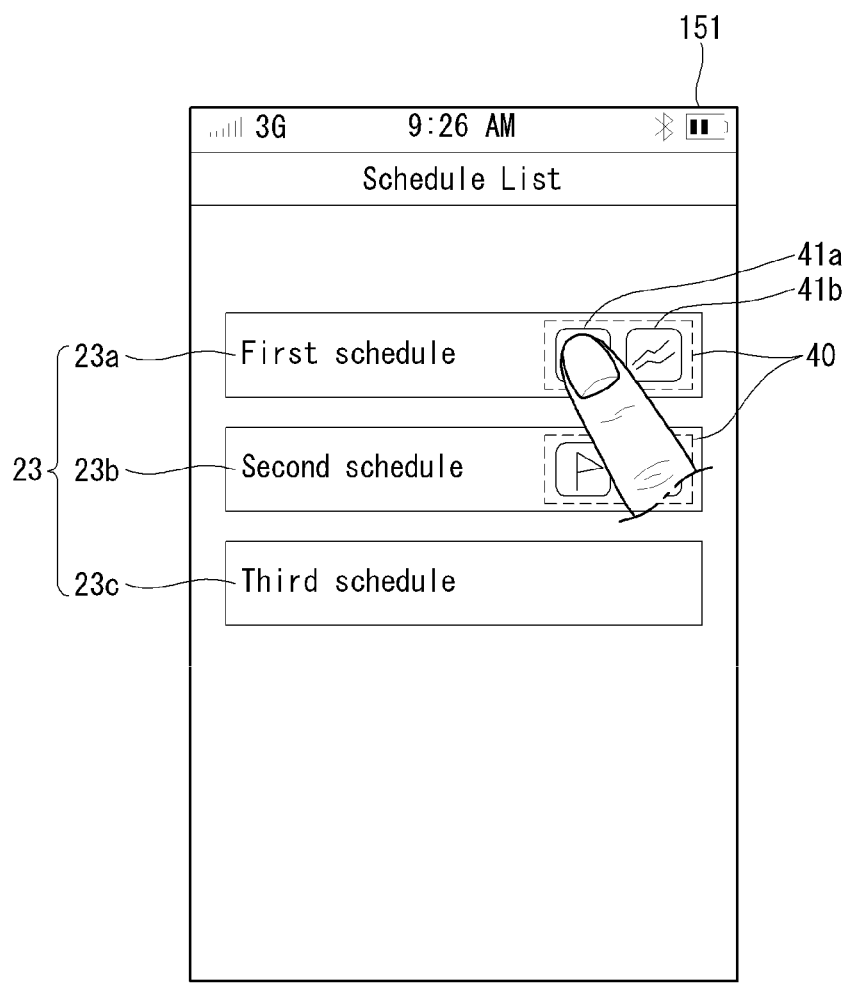
Figure 22:
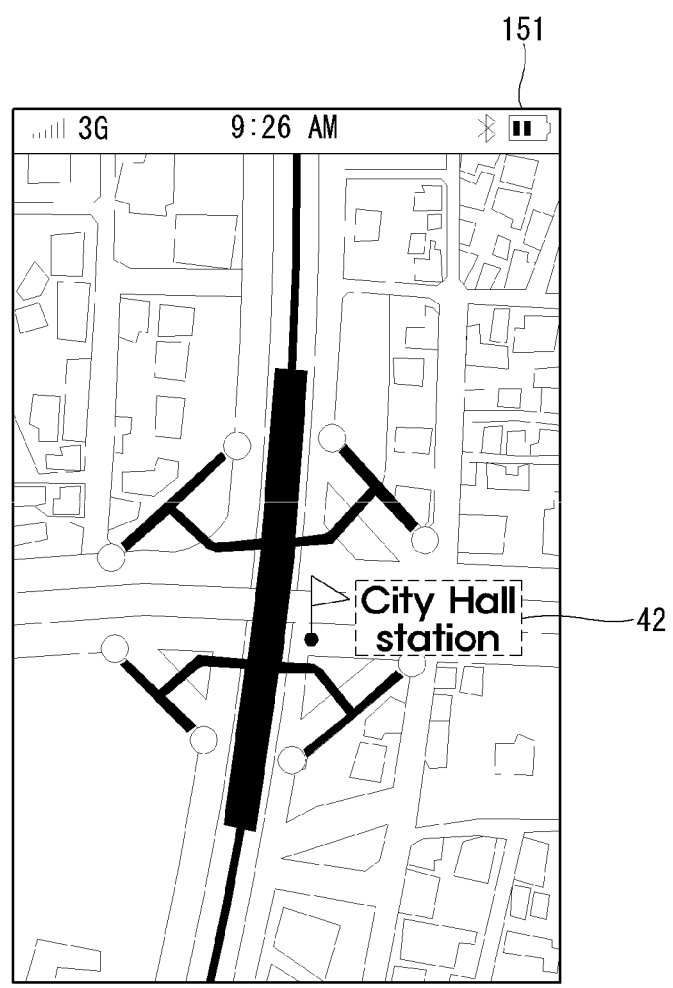

For example, in FIG. 20, information corresponding to reference numeral 41a, from the pieces of information corresponding to the map application, is an icon corresponding to a function of displaying position information related to a relevant schedule item. Furthermore, in FIG. 20, information corresponding to reference numeral 41b is an icon corresponding to a function for showing a person the way to a position related to a relevant schedule item. That is, when a user selects a position display function icon 41a displayed based on a first schedule 23a as shown in FIG. 21 and block S200 ob FIG. 12, the controller 180 may enter a map screen in order to display position information 42 included in the first schedule 23a as shown in FIG. 22 and block S210 of FIG. 12.

Figure 23:
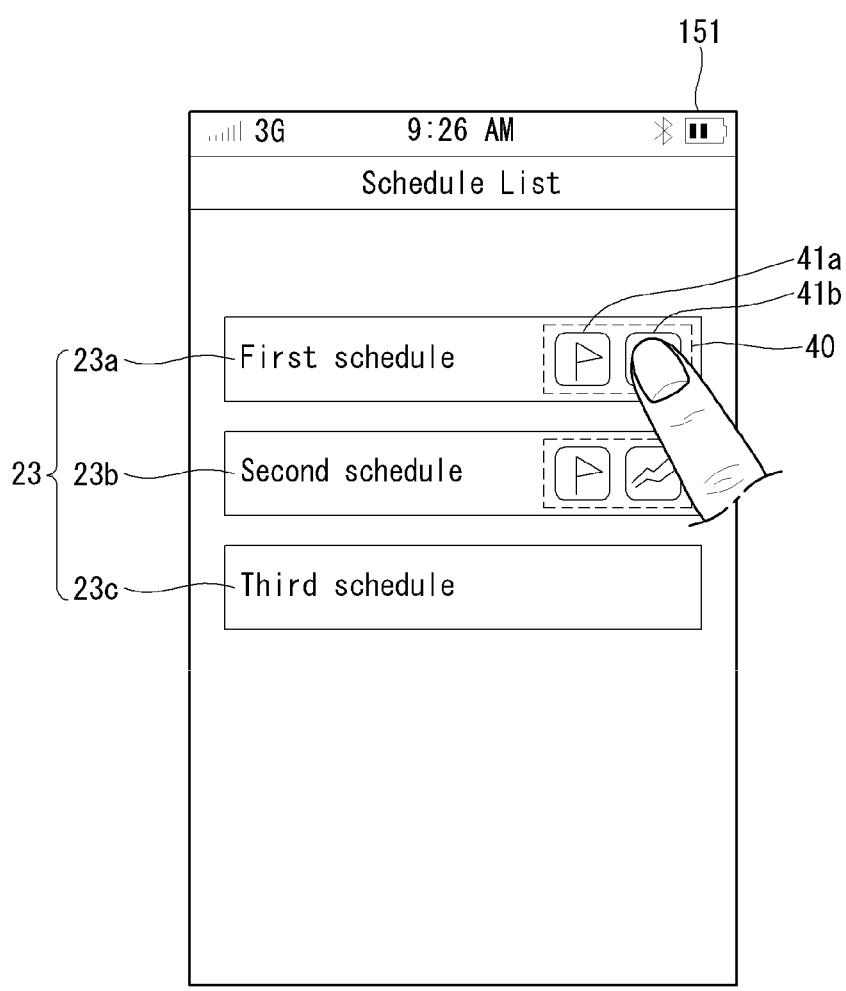
Figure 24:
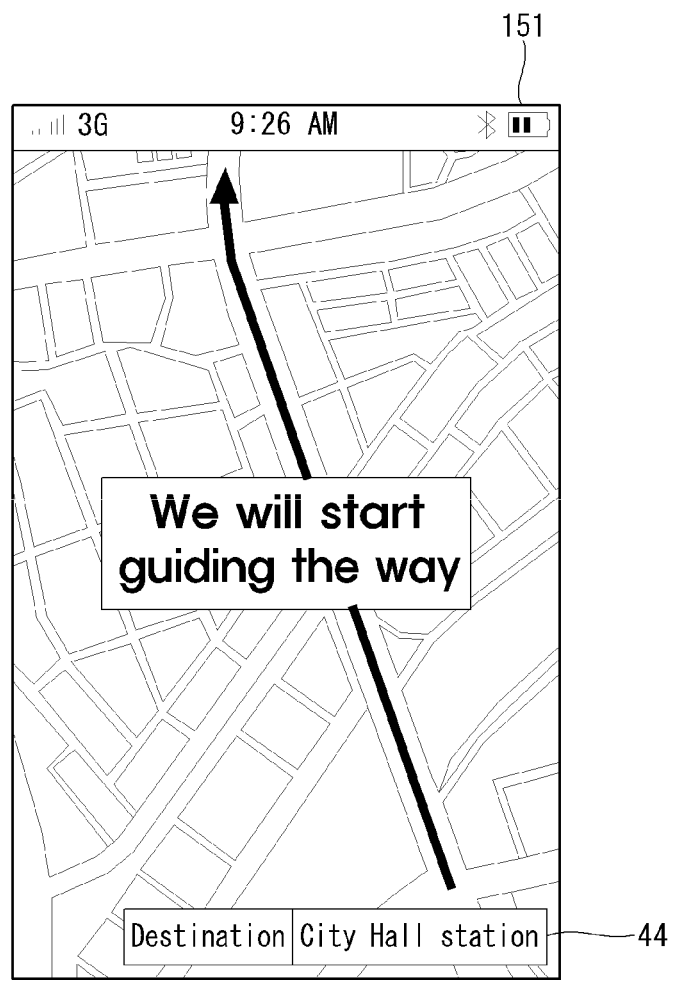

Furthermore, when a user selects a way guidance function icon 41b displayed based on the first schedule 23a as shown in FIG. 23 and block S200 of FIG. 12, the controller 180 may perform showing the way to a position or place, corresponding to the position information 42 included in the first schedule 23a, as shown in FIG. 24 and block S210 of FIG. 12. The screen shown in FIG. 24 may include destination information 44 that is commonly provided when the way is showed.

Figure 25:
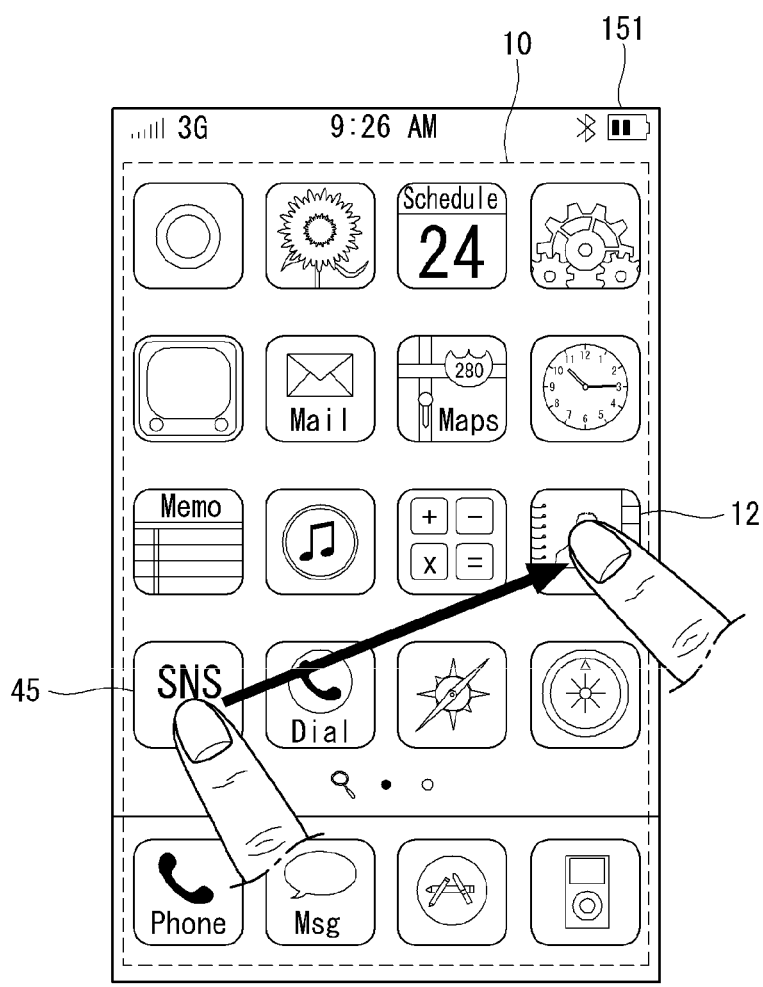

Referring to FIG. 25, a user may touch an icon 45 (corresponding to the second menu and the sub-menu) corresponding to an SNS (Social Network Service) application and move the touch to an icon 12 (corresponding to the first menu and the main menu) corresponding to a phone book (blocks S100, S110 of FIG. 5. The controller 180 may determine the phone book as the main menu (block S120 of FIG. 5), enter a phone book screen as shown in FIG. 26, and display pieces of phone book information 46, 47, 48, and 49, corresponding to the phone book, and information 50, corresponding to the SNS application, in the phone book screen (block S130 of FIG. 5).

Figure 26:
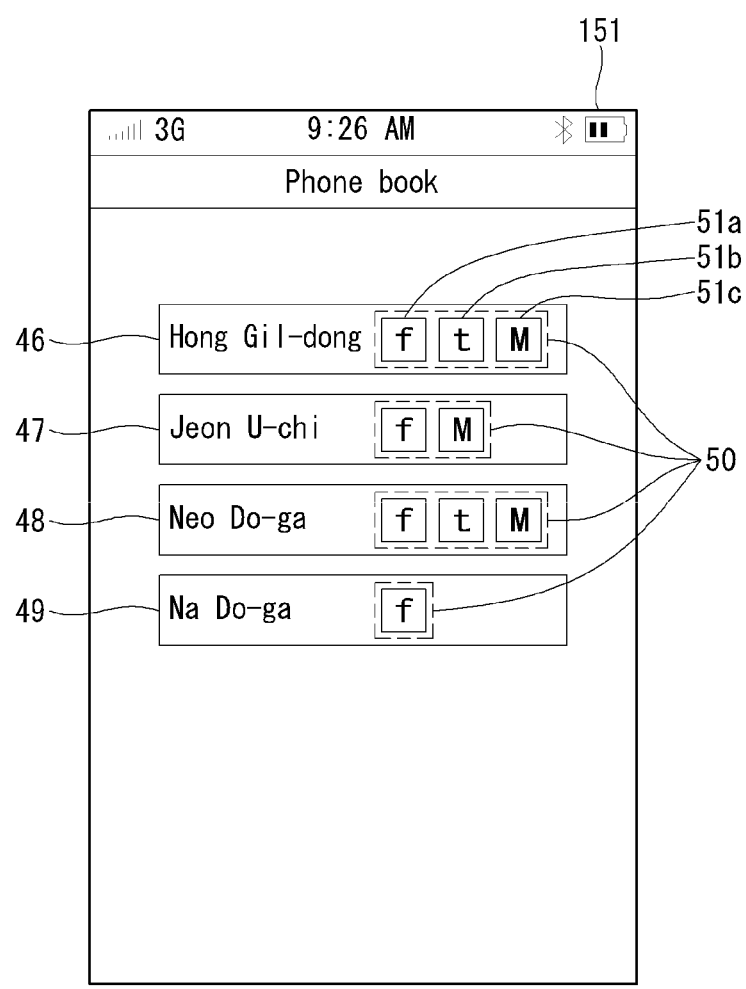

As described above, the information 50 corresponding to the SNS application shown in FIG. 26 may be used for accessing functions and information provided by the SNS application. For example, in FIG. 26, reference numerals 51a, 51b, and 51c are icons for accessing functions and pieces of information provided by different SNS applications. As another example, consider when a user selects a specific SNS icon 51a displayed based on a specific phone book item 46 (see block S200 of FIG. 12), the controller 180 may activate an SNS application corresponding to the specific SNS icon 51 and provide SNS information related to the specific phone book item 46 (see block S210 of FIG. 12).

Figure 27:
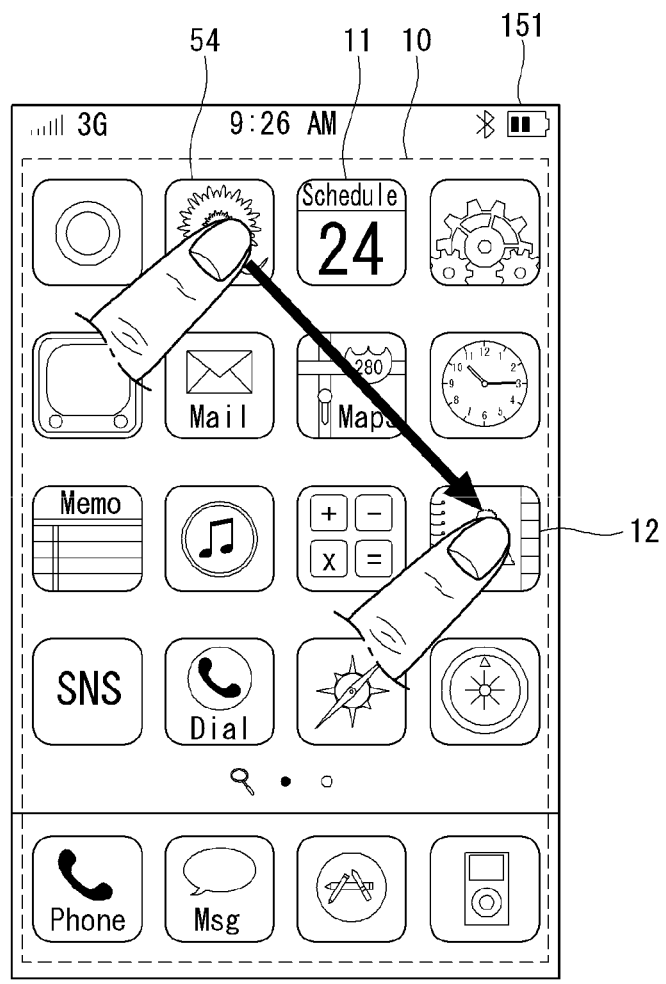
Figure 28:
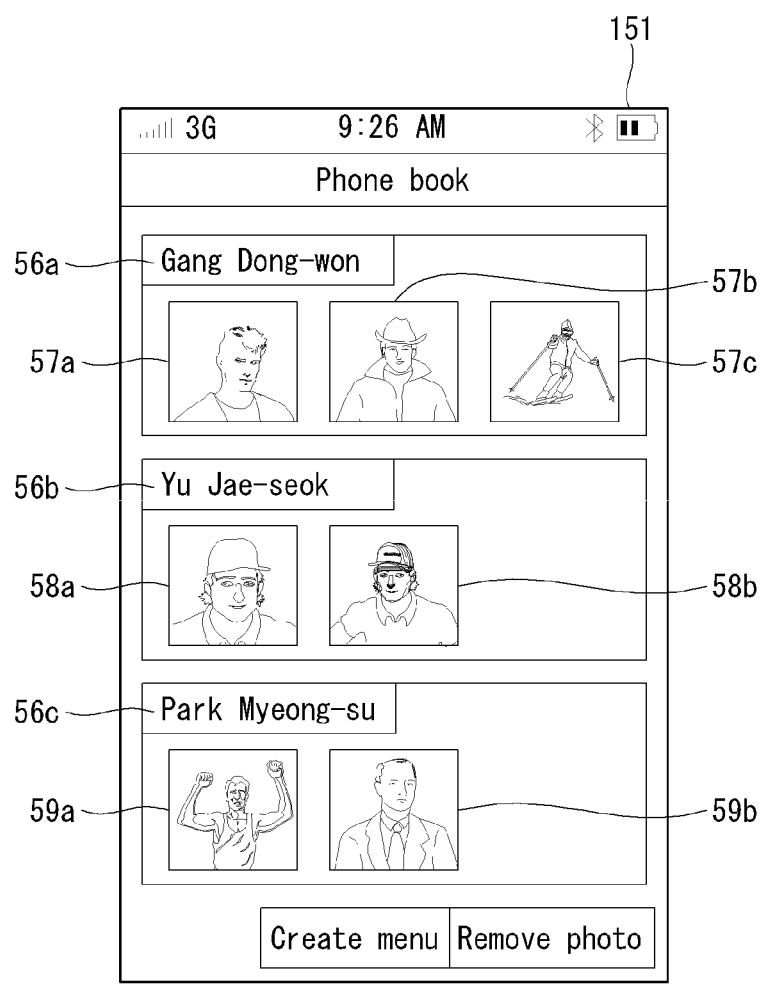

Referring to FIG. 27, a user may touch an icon 54 (corresponding to the second menu and the sub-menu) corresponding to a photo application and move the touch to an icon 12 (corresponding to the first menu and the main menu) corresponding to a phone book (see blocks S100, S110 of FIG. 5). The controller 180 may determine the phone book as the main menu (block S120 of FIG. 5), enter a phone book screen as shown in FIG. 28, and display pieces of phone book information 56a, 56b, and 56c, corresponding to the phone book, and pieces of information 57a, 57b, 57c, 58a, 58b, 59a, and 59b, corresponding to the photo application, in the phone book screen (block S130 of FIG. 5).

Here, the controller 180 may apply a face recognition algorithm to images that may be managed by the photo application and display an image corresponding to a phone book item so that it corresponds to the phone book item. For example, the controller 180 may search for an image similar to or identical with a representative image by using the representative image previously stored according to the phone book item.

The images that may be managed by the photo application might have been stored in the memory 160. For example, referring to FIG. 28, the controller 180 may obtain images 57*a*, 57*b*, and 57*c* corresponding to a phone book item "Gang Dong-won" 56*a* and display the obtained images 57*a*, 57*b*, and 57*c* so that they correspond to the phone book item "Gang Dong-won" 56*a*.

Figure 29:
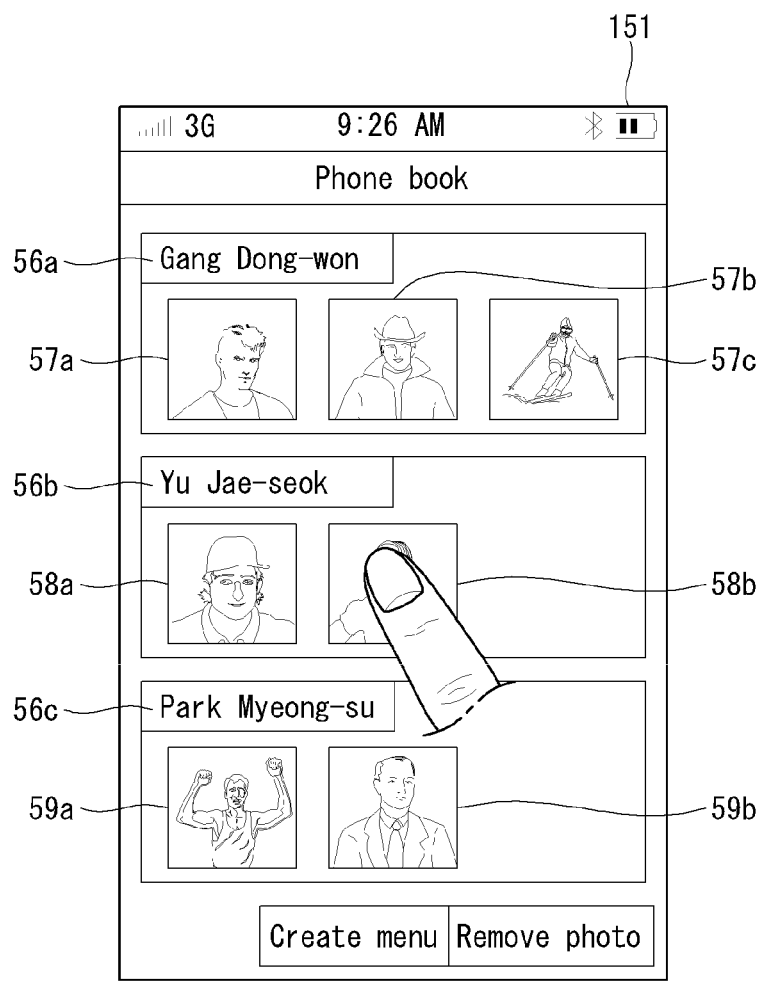
Figure 30:
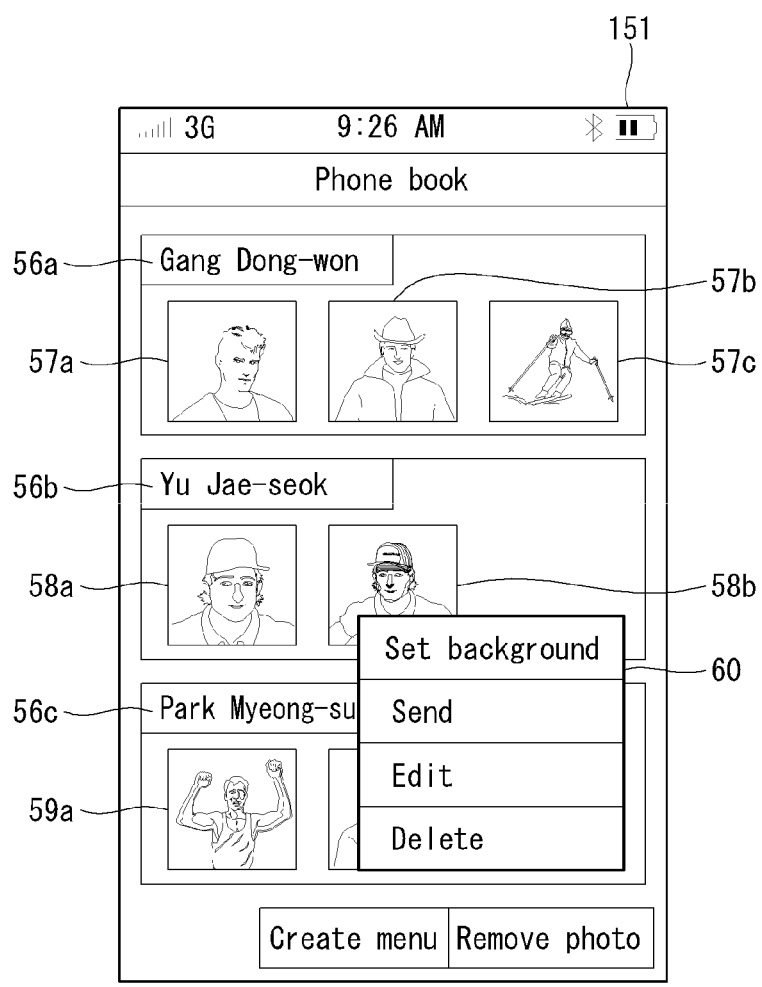

Meanwhile, when a user selects a specific image 58*b* displayed based on a specific phone book item 56*b* as shown in FIG. 29 (see also block S200 of FIG. 12), the controller 180 may provide a menu group 60, corresponding to at least some of functions provided by the photo application in relation to the specific image 58*b*, in the phone book screen as shown in FIG. 30 (see block S210 of FIG. 12).

Figure 31:
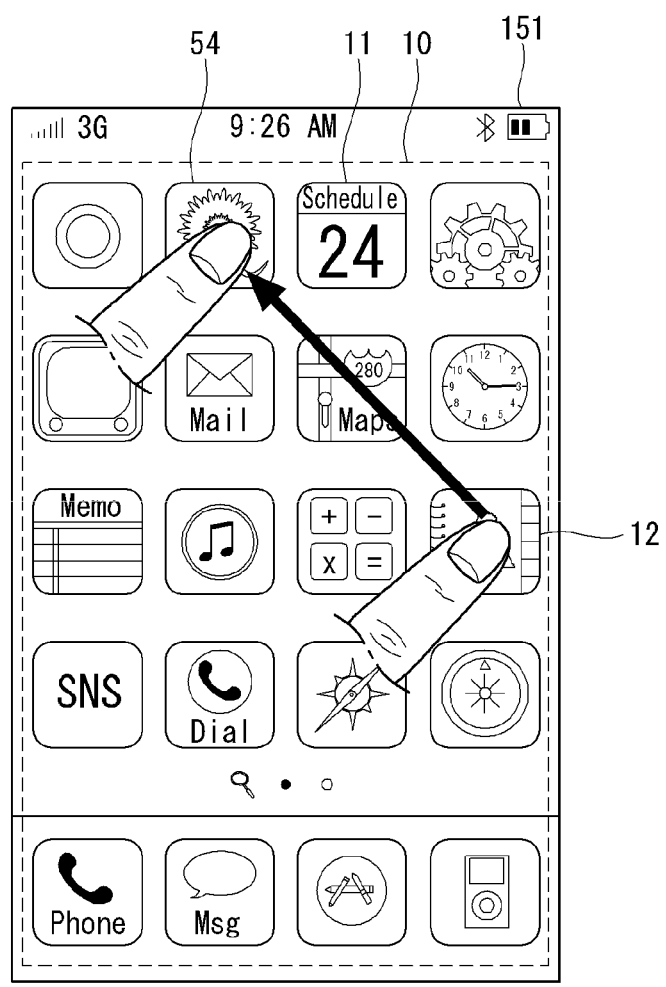
Figure 32:
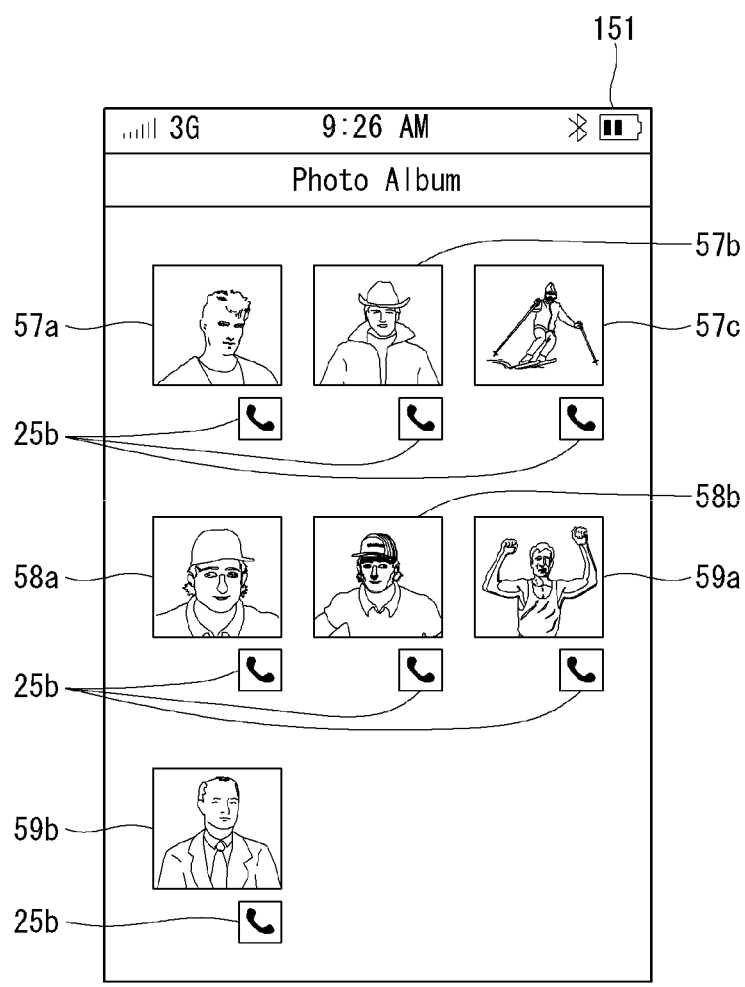
Figure 33:
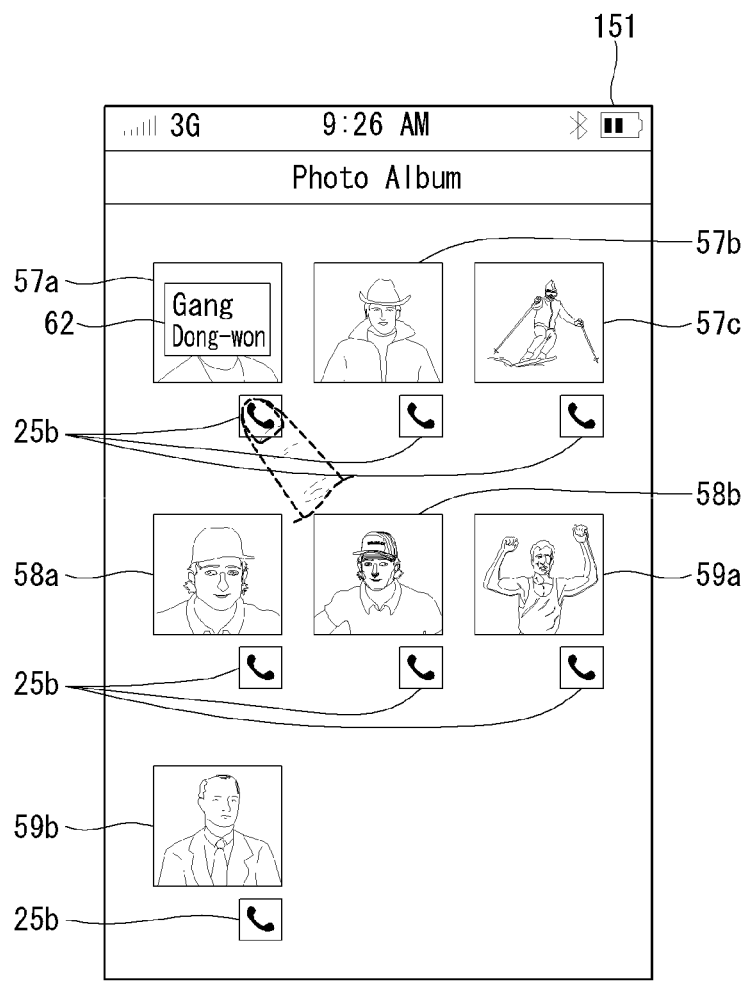

Referring to FIG. 31, a user may touch an icon 12 (corresponding to the second menu and the sub-menu) corresponding to a phone book and move the touch to an icon 54 (corresponding to the first menu and the main menu) corresponding to a photo application (see blocks S100, S110 of FIG. 5). The controller 180 may determine the photo application as the main menu (block S120 of FIG. 5), enter a photo application screen as shown in FIG. 32, and display pieces of information 57*a*, 57*b*, 57*c*, 58*a*, 58*b*, 59*a*, and 59*b*, corresponding to the photo application, and phone book icons 25*b* corresponding to the phone book (block S130 of FIG. 5). As described above, the pieces of information 57*a*, 57*b*, 57*c*, 58*a*, 58*b*, 59*a*, and 59*b* corresponding to the photo application are images stored in the memory 160.

The phone book icon 25*b* may be an icon corresponding to a function of dialing a specific counterpart matched with a face included in a relevant image or an icon to which a function of displaying phone book information about the counterpart has been allocated.

To this end, the controller 180 may search for a phone book item matched with each image by applying a face recognition algorithm to the images 57*a*, 57*b*, 57*c*, 58*a*, 58*b*, 59*a*, and 59*b* and may store the image and the phone book item if the result of the search satisfies a predetermined matching criterion.

A method of performing the function of dialing the other party corresponding to an image may be various. For example, referring to FIG. 33, when a user approaches his finger to a phone book icon 25*b* corresponding to a specific image 57*a* (see block S200 of FIG. 12), the controller 180 may display representative information (for example, a name 62) about a phone book item corresponding to a specific image 57*a* so that the representative information corresponds to the specific image 57*a*, before the finger touches the phone book icon 25*b* (block S210 of FIG. 12).

When a user moves his finger far from the phone book icon 25, the representative information (for example, the name 62) may disappear. Furthermore, for example, when a user touches the specific image 57*a* using his finger (or, when a certain time elapses after the touch), such as that shown in block S200 of FIG. 12, the controller 180 may dial a telephone number corresponding to the specific image 57*a* (block S210 of FIG. 12).

Figure 34:
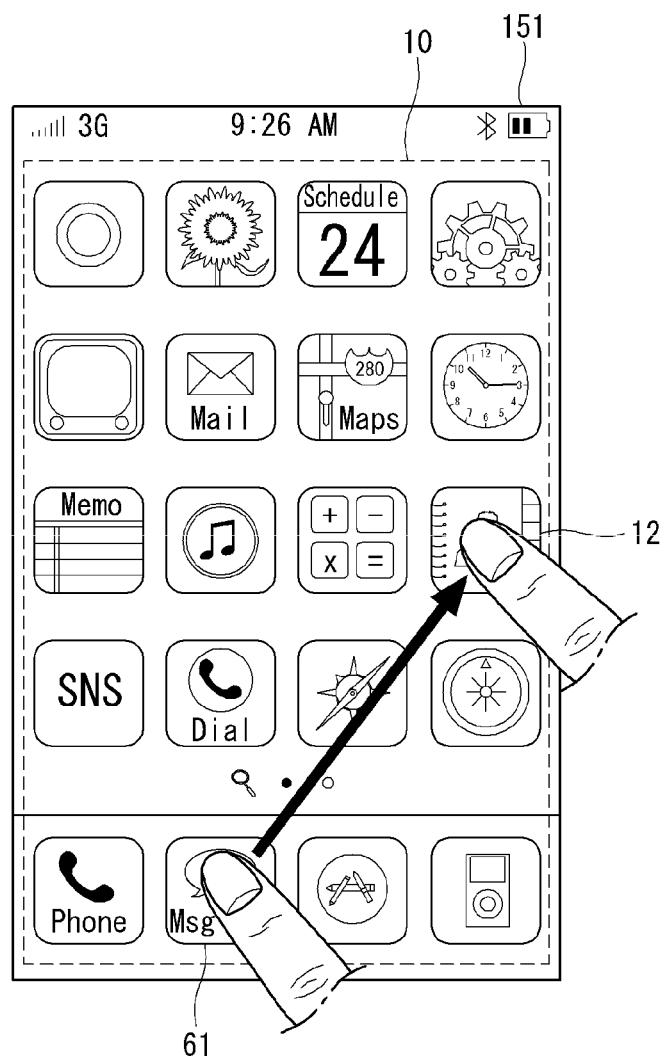
Figure 35:
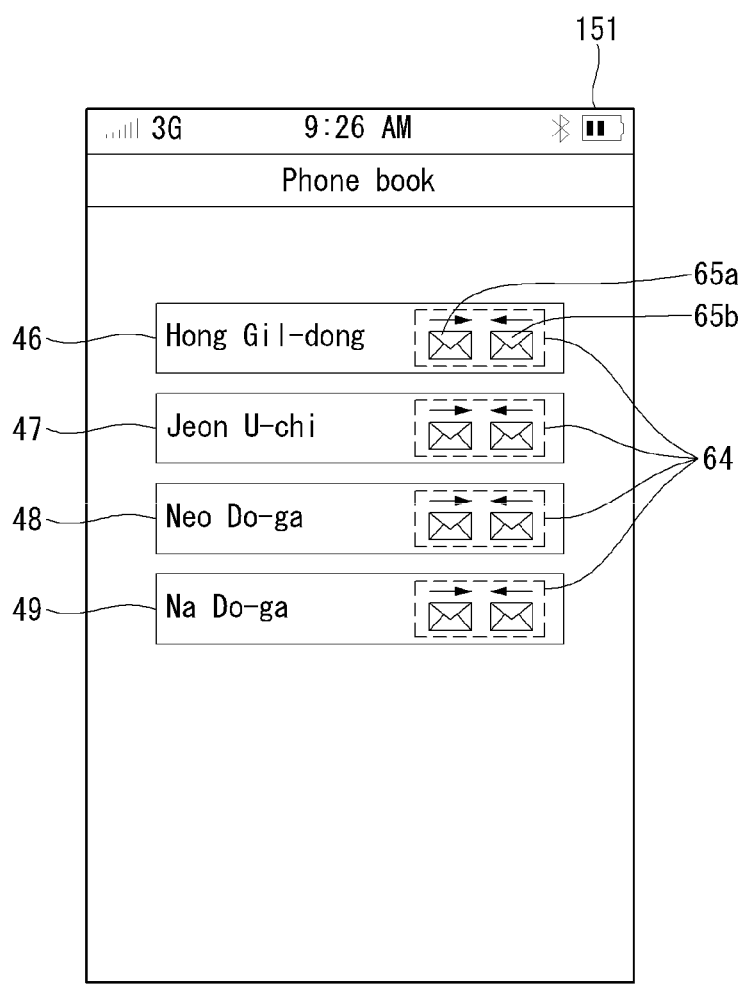

Referring to FIG. 34, a user may touch an icon 61 (corresponding to the second menu and the sub-menu) corresponding to a message application and move the touch to an icon 12 (corresponding to the first menu and the main menu) corresponding to a phone book (see blocks S100, S110 of FIG. 5). The controller 180 may determine the phone book as the main menu (block S120 of FIG. 5), enter a phone book screen as shown in FIG. 35, and display pieces of phone book information 46, 47, 48, and 49 corresponding to the phone book and pieces of message information 64 corresponding to the message application (block S130 of FIG. 5).

Here, the controller 180 may classify messages, exchanged with the outside, by the phone book item. The pieces of message information 64 may include a sent message icon 65*a* to which a function of providing information about a sent message has been allocated and a received message icon 65*b* to which a function of providing information about a received message has been allocated, as shown in FIG. 35. For example, when a user selects the sent message icon 65*a* displayed based on a specific phone book item 46 (block S200 of FIG. 12), the controller 180 may display a list of messages, sent from the mobile terminal 100 to the other party corresponding to the specific phone book item 46, in the touch screen 151 (block S210 of FIG. 12).

Furthermore, for example, when a user selects the received message icon 65*b* displayed based on the specific phone book item 46 (block S200 of FIG. 12), the controller 180 may display a list of messages, received from the other party corresponding to the specific phone book item 46, in the touch screen 151 (block S210 of FIG. 12).

Figure 36:
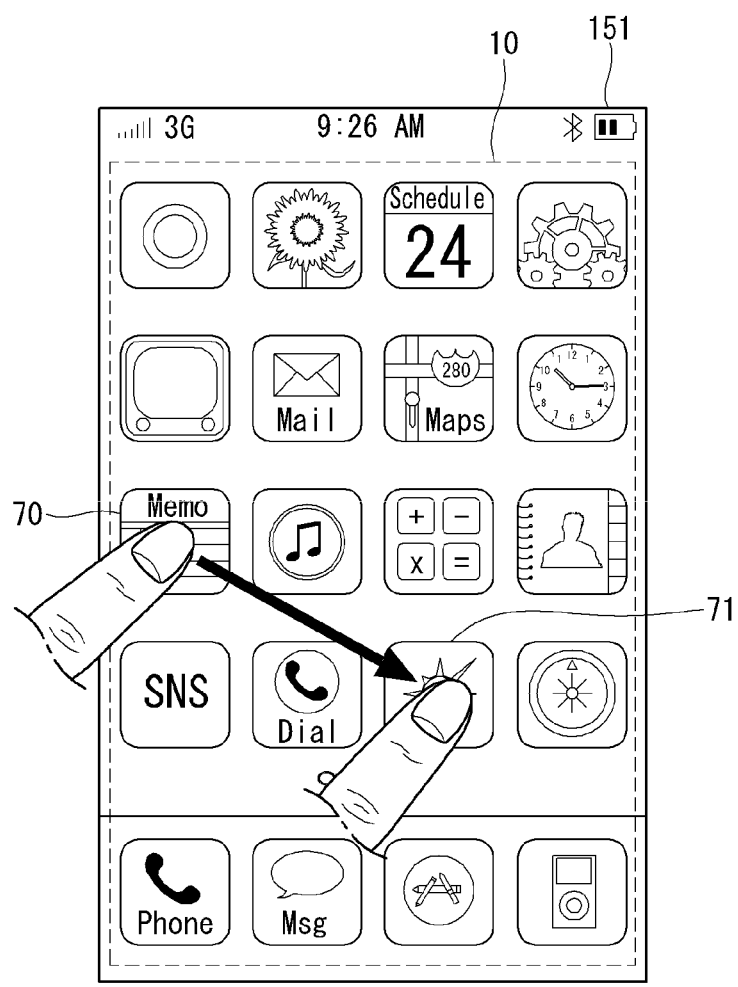

Referring to FIG. 36, a user may touch an icon 70 (corresponding to the second menu and the sub-menu) corresponding to a memo application and move the touch to an icon 71 (corresponding to the first menu and the main menu) corresponding to a web browser (see blocks S100, S110 of FIG. 5).

Figure 37:
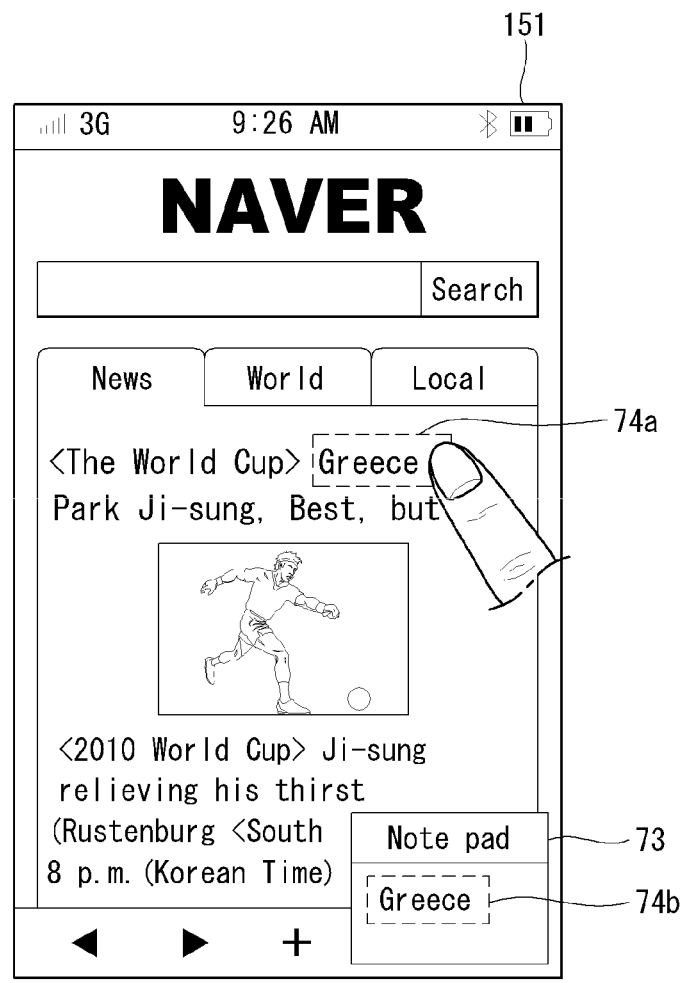

The controller 180 may determine the web browser as the main menu (block S120 of FIG. 5), enter a web browser screen as shown in FIG. 37, and display a web page set as an initial screen (corresponding to information corresponding to the web browse) and a memory function region 73 (that is, information corresponding to the memo application) (block S130 of FIG. 5).

The memory function region 73 is a region in which a memo function provided by the memo application can be used in the web browser screen. For example, referring to FIG. 37, when a user selects specific text 74*a* in the web browser screen, the controller 180 may copy the same text 74*b* as the selected specific text to the memory function region 73.

When a user selects the memory function region 73 in such a way to long touch the memory function region 73 using his finger (see also block S200 of FIG. 12), the controller 180 may store the text 74*b*, copied to the memory function region 73, as a memo that may be managed by the memo application (block S210 of FIG. 12).

Figure 38:
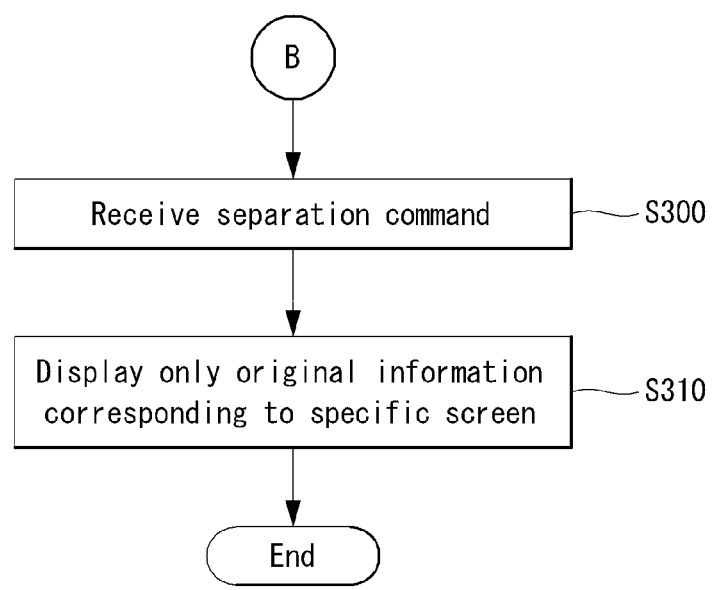
FIG. 38 is a flowchart illustrating a method of controlling the mobile terminal according to further embodiments of the invention.

FIG. 38 is a flowchart illustrating a method of controlling the mobile terminal (e.g., mobile terminal 100) according to a further embodiment, and FIGS. 39 to 42 are diagrams illustrating methods for controlling the mobile terminal according to such an embodiment. In some scenarios some or all of the previously described embodiments may be performed prior to the embodiment shown in FIG. 38.

Referring to FIG. 38, the controller 180 may receive a separation command for separating one of the first menu and the second menu, determined as the sub-menu, from the other of the first menu and the second menu in the first embodiment and the second embodiment of the invention (block S300).

The controller 180 may delete information, corresponding to the sub-menu, from the specific screen determined at block S120 of FIG. 5 in response to the separation command and display only original information corresponding to the specific screen (block S310).

Figure 39:
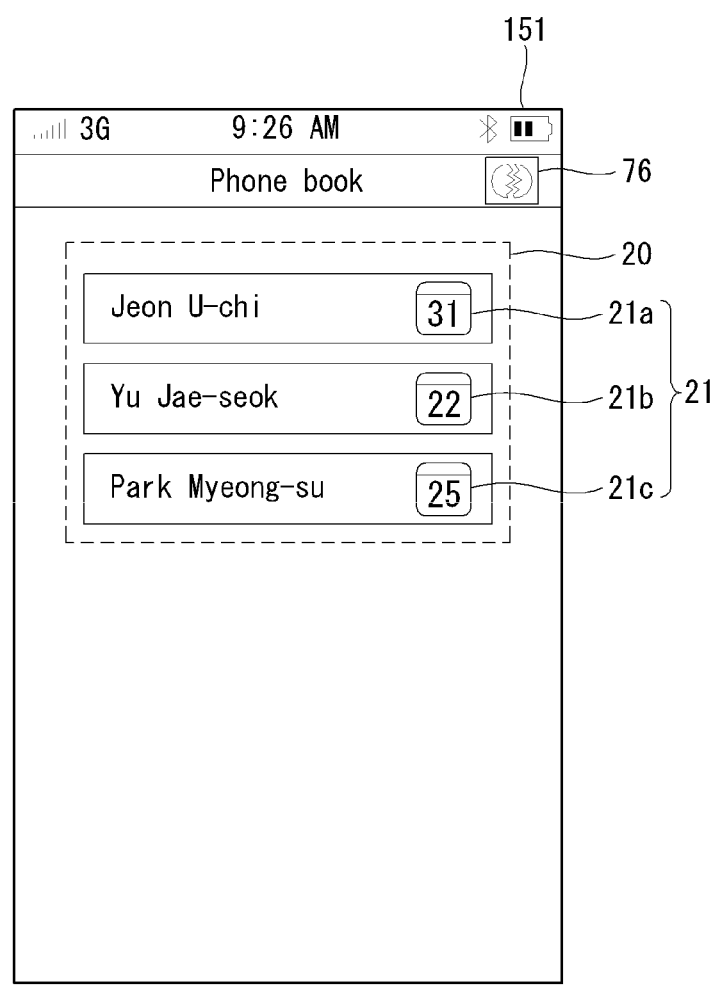
FIGS. 39 to 42 are diagrams illustrating the method of controlling the mobile terminal according to the embodiment of FIG. 38.
Figure 40:
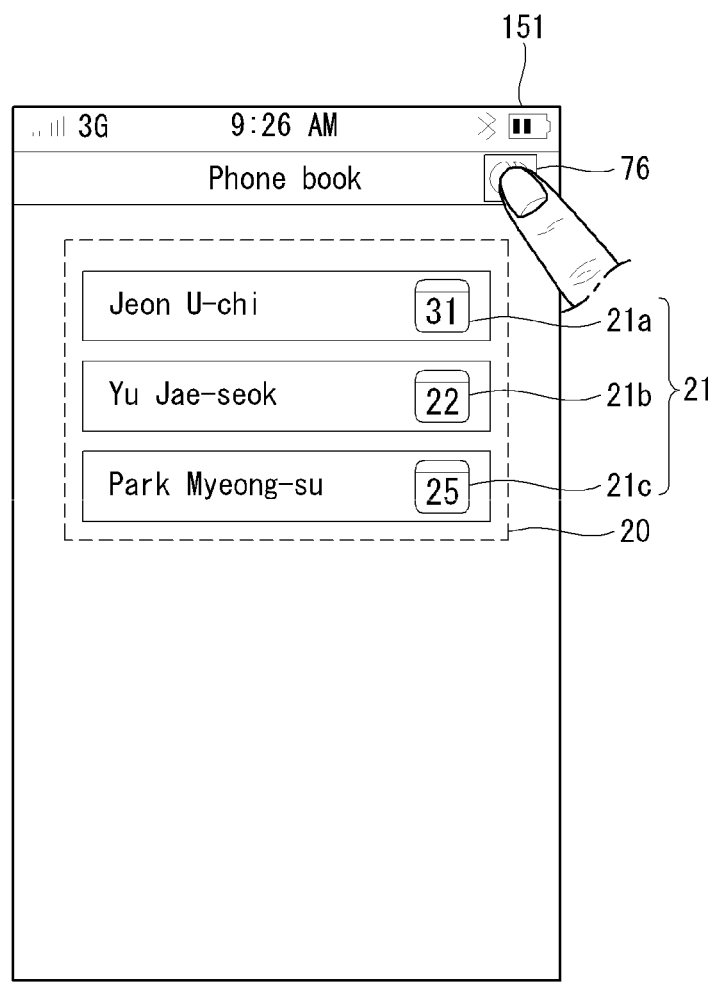
Figure 41:
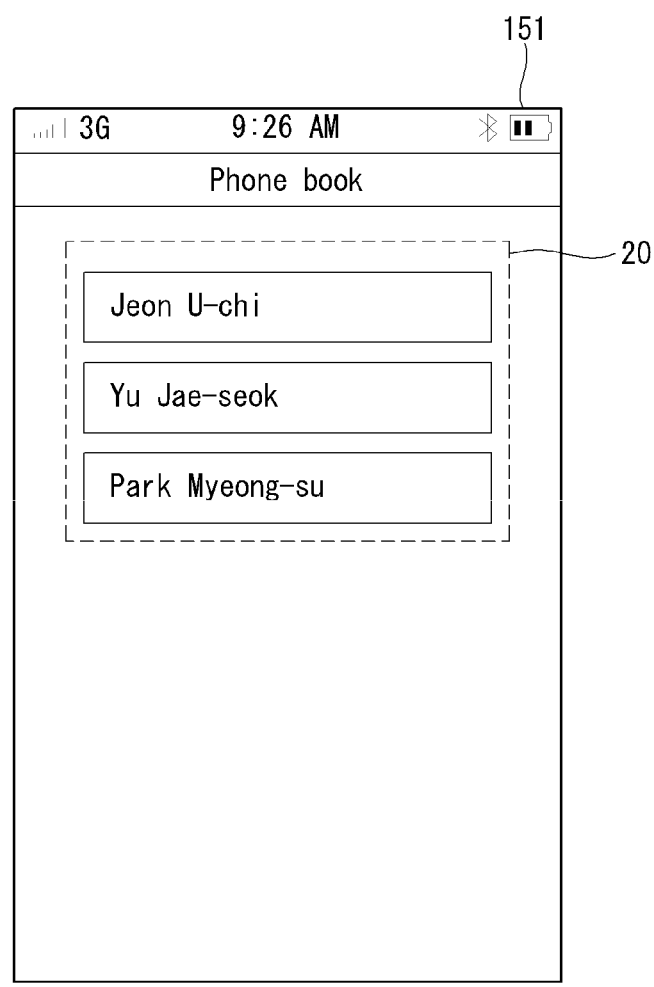

Referring to FIG. 39, controller 180 may further provide a separation icon 76 for receiving the separation command to the specific screen determined at step S120. When a user selects the separation icon 76 as shown in FIG. 40 (block S300 of FIG. 38), the controller 180 may delete the pieces of schedule information 21 displayed in the screen of FIG. 8 and display only the phone book item list 20, as shown in FIG. 41 (block S310 of FIG. 38). That is, the controller 180 may perform control so that only the original function of the main menu is provided in response to the separation command in the state in which the main menu and the sub-menu (that is, the first menu and the second menu) are combined according to the previously described embodiment.

Figure 42:
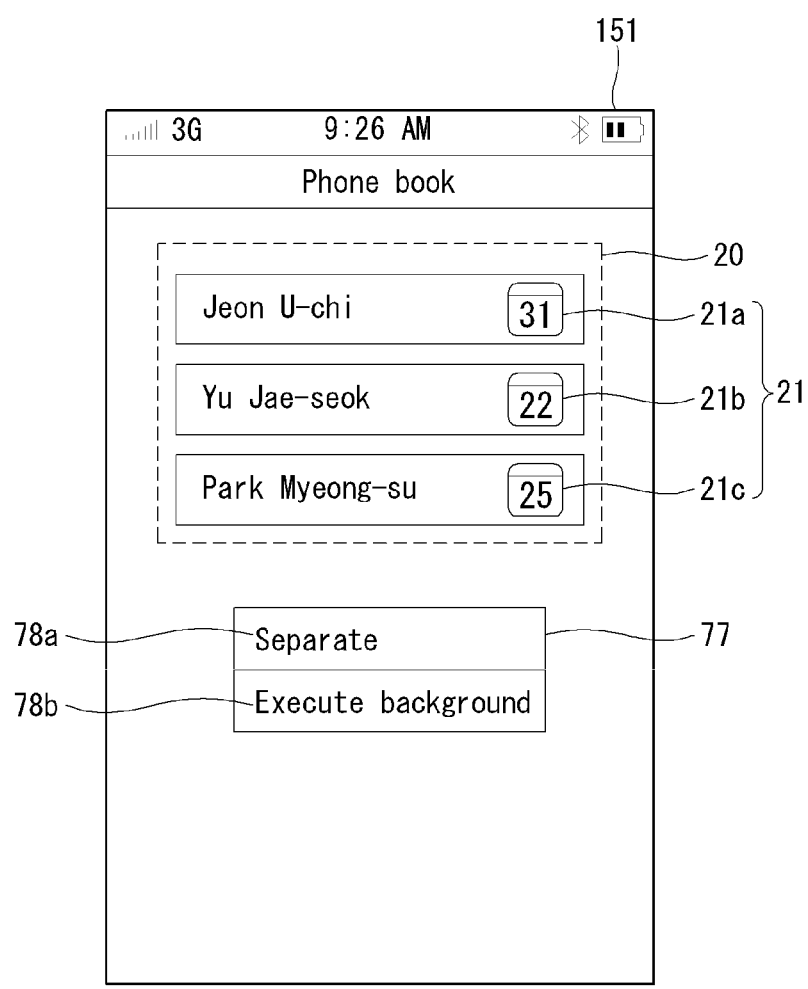

Meanwhile, in FIG. 40, when a user selects the separation icon 76, the controller 180 may give option to the user by providing a menu group 77 shown in FIG. 42. The menu group 77 shown in FIG. 42 may include a menu 78a to which the menu separation function has been allocated and a menu 78b to which a function of deleting information corresponding to the sub-menu is deleted, but continuing to execute (or activate) an application corresponding to the sub-menu as background has been allocated. A user may control a desired function so that it is controlled by selecting a specific one of the menus 78a and 78b included in the menu group 77.

Figure 43:
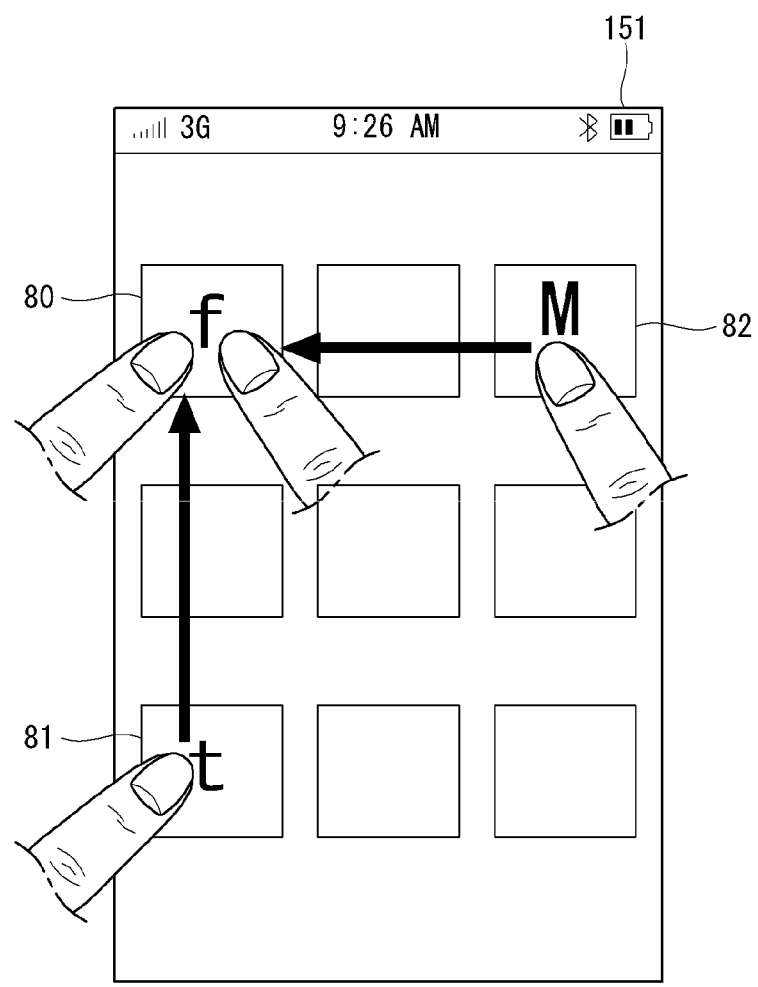
FIGS. 43 to 45 are diagrams illustrating an embodiment in which three menus are combined.
Figure 44:
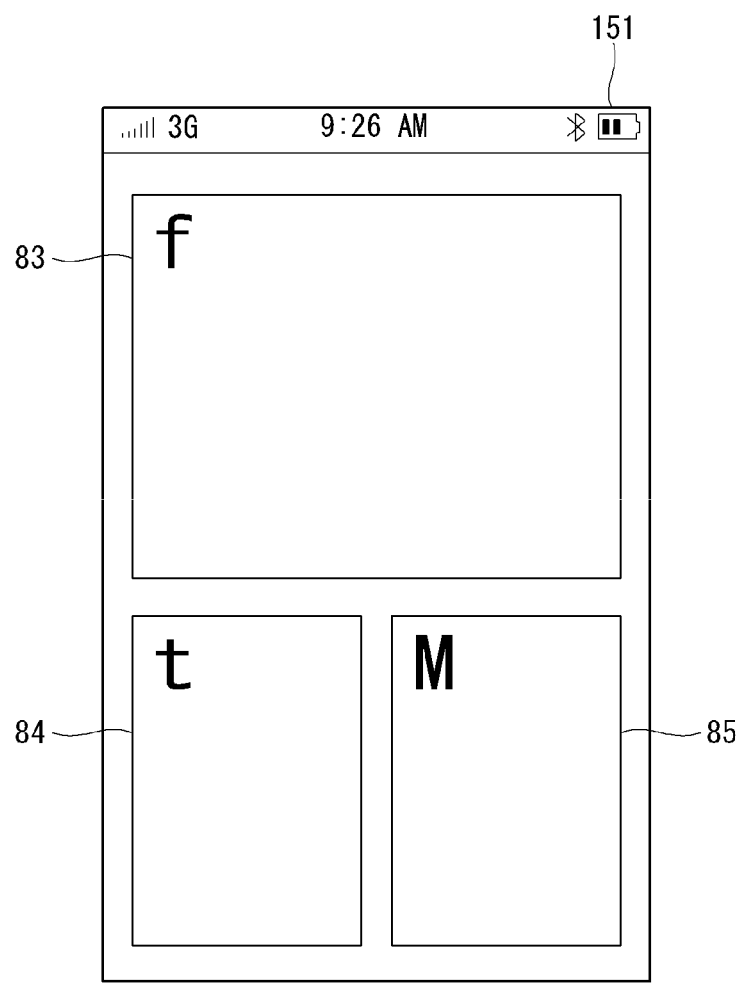
Figure 45:
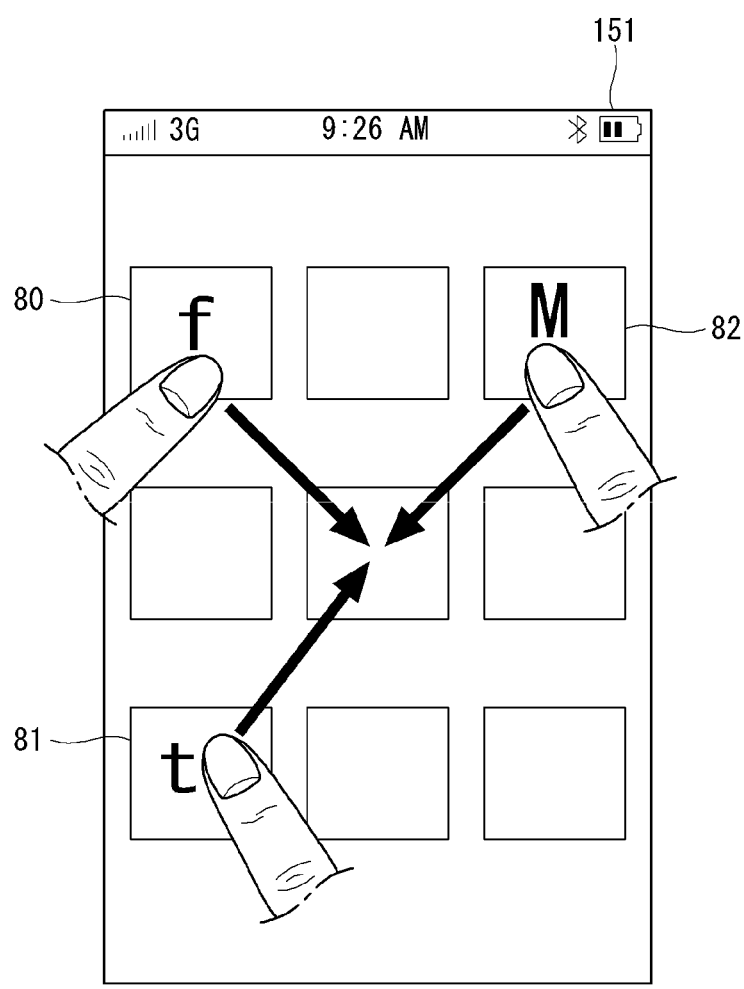

The foregoing embodiments provide examples in which two menus are considered and combined, but greater numbers of menus may likewise be combined using the same or similar techniques. By way of further illustration, FIGS. 43 to 45 are diagrams illustrating embodiments in which three menus are combined. For example, referring to FIG. 43, the controller 180 may display a plurality of menus, comprising third to fifth menus 80, 81, and 82 corresponding to different SNS applications, respectively, in the touch screen 151. As shown in FIG. 43, a user may touch the fourth menu 81 and the fifth menu 82 using two fingers and move the two touches to the third menu 80.

The controller 180 may determine the third menu 80 (that is, the final destination of the two touch movements) as the main menu and enter a screen corresponding to the main menu 80 as shown in FIG. 44. Furthermore, the controller 180 may provide information 83 corresponding to the third menu 80, information 84 corresponding to the fourth menu 81, and information 85 corresponding to the fifth menu 82 to the screen corresponding to the main menu 80 at the same time.

The screen shown in FIG. 44 is a screen in which information (or a function) provided by the fourth menu 81 and information (or a function) provided by the fifth menu 82 are imported into a screen (or an application) corresponding to the third menu 80 and combined in the screen. Meanwhile, the method of entering the screen shown in FIG. 44 may vary from that shown with regard to FIG. 43. For example, referring to FIG. 45, when a user touches the third to fifth menus 80, 81, and 82 using three fingers and performs an operation of gathering the third to fifth menus 80, 81, and 82 to the center of the touch screen 151, the controller 180 may enter the screen shown in FIG. 44.

Figure 46:
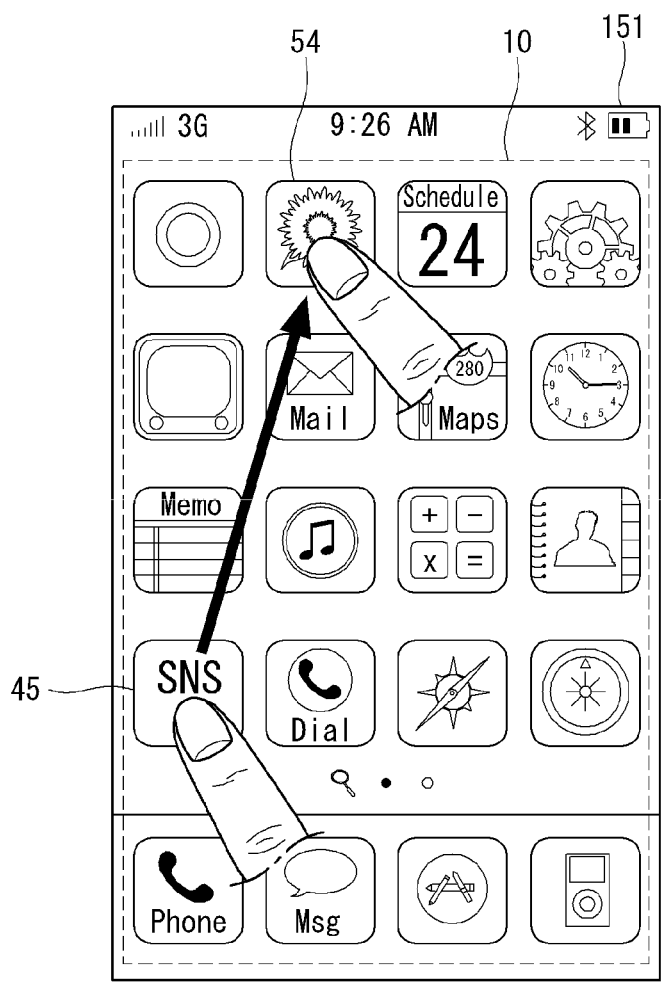
FIGS. 46 to 48 are diagrams illustrating other examples to which various embodiments may be applied.
Figure 47:
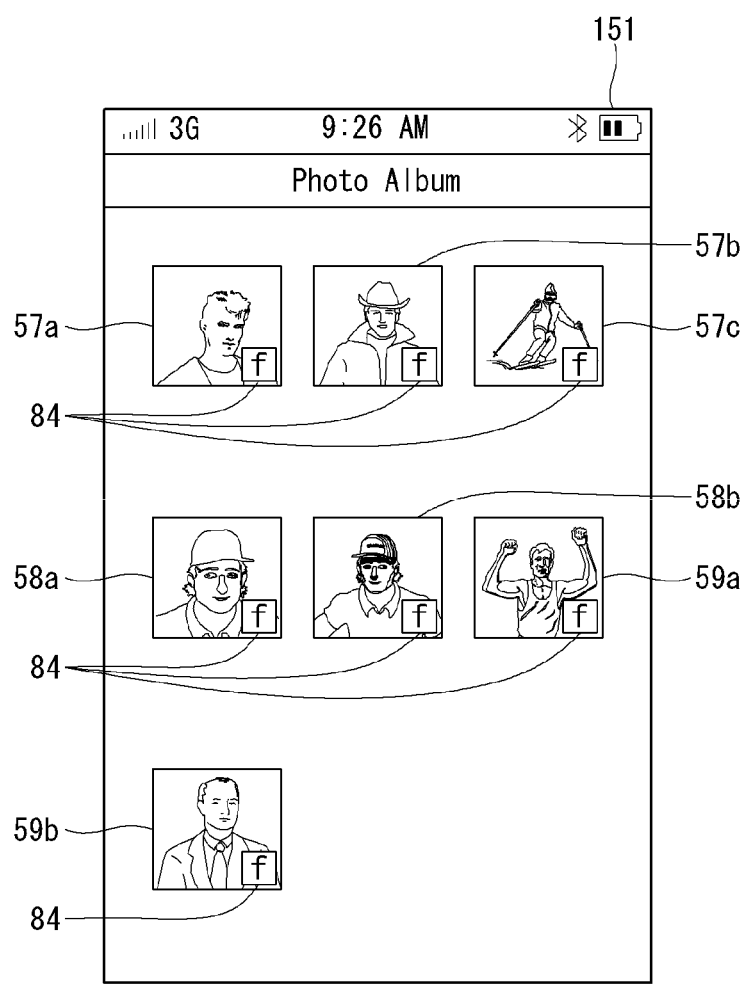
Figure 48:
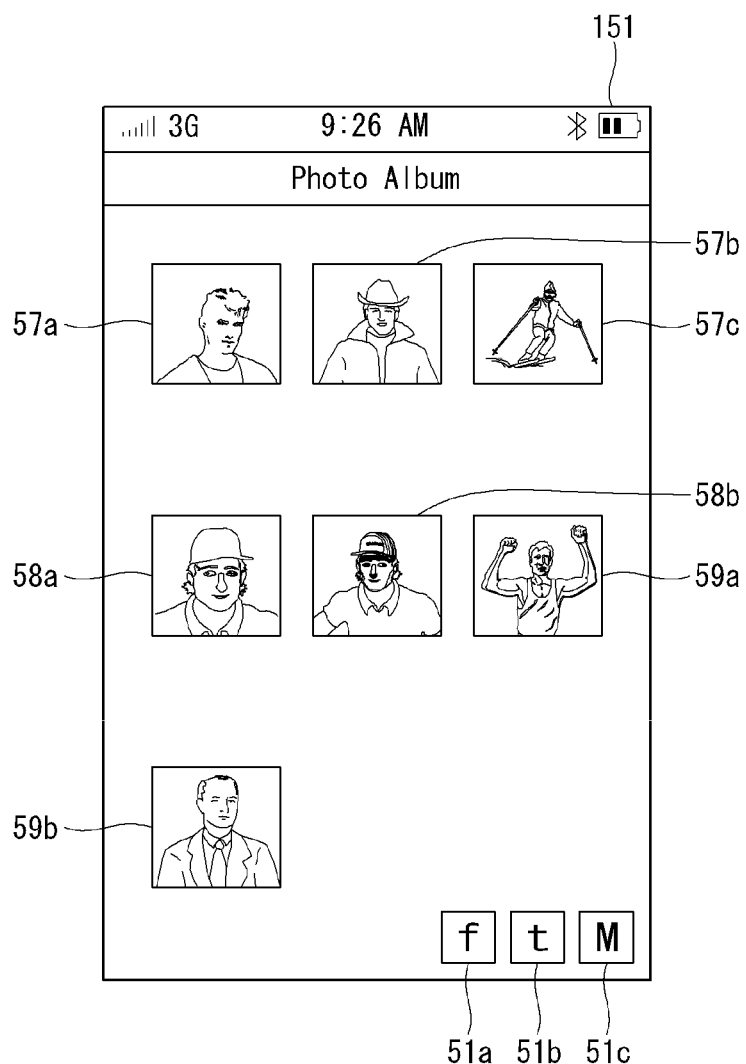

FIGS. 46 to 48 are diagrams illustrating other examples to which the earlier presented embodiments may be applied, and the assumptions made for FIGS. 46 to 48 apply equally to those set out with regard to FIGS. 17 to 37.

Referring to FIG. 46, a user may touch an icon 45 (corresponding to the second menu and the sub-menu) corresponding to an SNS application and then move the touch to an icon 54 (corresponding to the first menu and the main menu) corresponding to a photo application (blocks S100, S110 of FIG. 5). The controller 180 may determine the photo application as the main menu (block S120 of FIG. 5), enter a photo album as shown in FIG. 47, display a plurality of photos 57a, 57b, 57c, 58a, 58b, 59a, and 59b (that is, pieces of information corresponding to the photo application), and display icons 84 (that is, pieces of information corresponding to the SNS application) for executing a function corresponding to the SNS application.

Furthermore, the controller 180 may provide a screen, such as that shown in FIG. 48, to the touch screen 151. In FIG. 48, there is provided means for accessing functions (comprising pieces of information) respectively provided by a plurality of different SNS applications 51a, 51b, and 51c.

When a user selects the icon 84 (block S200 of FIG. 12), the controller 180 may send a photo corresponding to a specific blog using the SNS application or provide a user interface for sending the photo (block S210 of FIG. 12). Meanwhile, if two or more menus are combined, the controller 180 may control the display of relevant icons in order to indicate the combination of the two or more menus.

Figure 49:
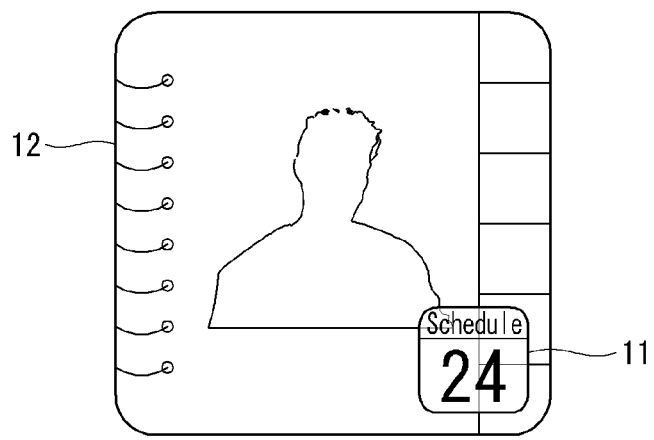
FIGS. 49 and 50 are diagrams illustrating icons (or menus) that may be newly generated according to assorted embodiments.
Figure 50:
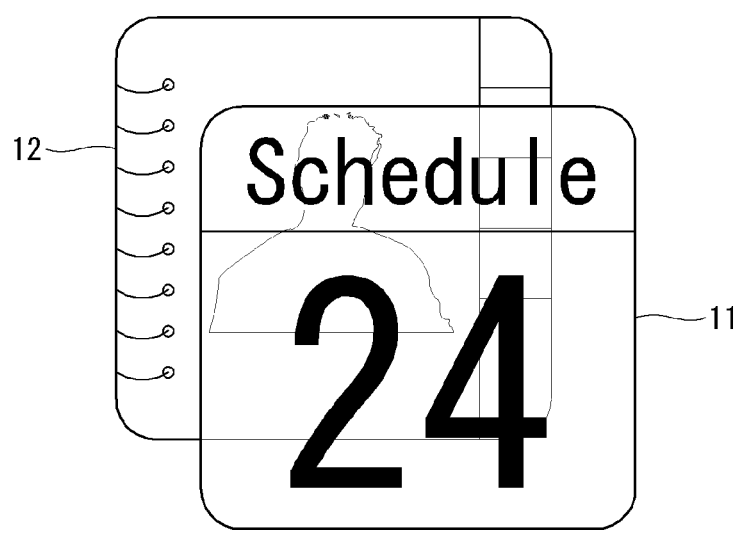

FIGS. 49 and 50 are diagrams illustrating icons (or menus) that may be newly generated according to still further embodiments. Referring to FIG. 49, if the phone book and the schedule application are combined and the phone book is the main menu, the controller 180 may display an icon, corresponding to the schedule application 11, within the icon 12 corresponding to the phone book so that the icon corresponding to the schedule application 11 is smaller than the icon 12 corresponding to the phone book.

Furthermore, referring to FIG. 50, if the phone book and the schedule application are combined and the phone book is the main menu, the controller 180 may display an icon, corresponding to the schedule application 11 and having the original size, on the icon 12 corresponding to the phone book so that the icon corresponding to the schedule application 11 overlaps with the icon 12.

Furthermore, the controller 180 may display an icon 90 shown in FIG. 49 or an icon 91 shown in FIG. 50 in the touch screen 151, store the icon 90 or 91 in the memory 160, and generate and store the icon 90 or 91 as a new menu.

The icon 90 or 91 may be stored in the memory 160 and displayed as wallpaper (or a standby screen) although the phone book and the schedule application combined together are separated from each. A user may enter a screen in which the phone book is the main menu and the schedule application is the sub-menu by selecting the icon 90 or 91.

The various methods presented herein may be implemented on a computer-readable recording medium in the form of a program for being executed on a computer or other processor. Various embodiments presented herein may be used to permit a user to use different functions, respectively provided by different applications, in one screen very conveniently. Furthermore, according to disclosed embodiments, a user can efficiently access a desired function by combining different applications as may be desired.

The methods presented herein may be executed through software, such that code segments execute necessary tasks. The program or the code segments may be stored in a processor-readable medium or may be transmitted through a transfer medium or in the form of a computer data signal combined with carriers over a communication network.

The computer-readable recording medium may include all kinds of recording devices in which data readable by a computer system is stored. For example, the computer-readable recording medium may include ROM, RAM, CD-ROM, DVD-ROM, DVD-RAM, magnetic tapes, floppy disks, hard disks, and optical data storages. The computer-readable recording medium may also have its code stored and executed in such a way to be distributed into computer apparatuses connected over a network and readable by computers in a distributed manner.

Those having ordinary skill in the art to which this document pertains may change and modify this document in various ways without departing from the technical spirit of this document. Accordingly, this document is not limited to the above-described embodiments and the accompanying drawings. Further, the embodiments described in this document should not be construed to be limitative from all aspects, and some of or all the embodiments may be selectively combined in various ways.

What is claimed is:

1. A display method in a mobile terminal, the method comprising:
   displaying a plurality of menu items on a display of the mobile terminal, wherein the plurality of menu items comprises a first menu item and a second menu item correspond respectively to a different function that is executable at the mobile terminal;
   receiving an touch input for combining the first menu item and the second menu item by moving the first menu item to the second menu item;
   displaying an executing screen of a main menu item, wherein the main menu is determined as one of the combined menu items in response to the touch input;
   displaying first data by incorporating second data in the executing screen of the main menu item, the first data being data that is associated with the function that corresponds to the main menu item, and the second data being data that is associated with the function that corresponds to a sub menu item of the combined menu items.

2. The method of claim 1, wherein the touch input for combining further comprises:
   receiving user touch input at the display at an area that generally corresponds to a displayed area of the first menu item, wherein the user touch input comprises a dragging which terminates at an area of the display which generally corresponds to a displayed area of the second menu item.

3. The method of claim 1, wherein the touch input for combining further comprises:
   receiving first user touch input at the display at an area that generally corresponds to a displayed area of the first menu item;
   receiving second user touch input at the display at an area that generally corresponds to a displayed area of the second menu item; and
   wherein the first user touch input and the second user touch input each comprise a dragging that each terminates at a generally same region of the display.

4. The method of claim 1, wherein the touch input for combining further comprises:
   receiving first user touch input at the display at an area that generally corresponds to a displayed area of the first menu item;
   receiving second user touch input at the display at an area that generally corresponds to a displayed area of the second menu item; and
   wherein the selecting of the first menu item and the second menu item occurs when the first user touch input and the second user touch input each occur for a threshold amount of time.

5. The method of claim 1, further comprising:
   selecting a particular item of the second data displayed in the executing screen of the main menu item responsive to further user input; and
   displaying an executing screen of the sub menu item on the display.

6. The method of claim 5, further comprising:
   displaying third data and fourth data in the executing screen of the sub menu, the third data being data that is associated with the function that corresponds to the selected second menu item, and the fourth data being data that is associated with the function that corresponds to the selected first menu item.

7. The method of claim 1, wherein each of the different functions that individually correspond to one of the plurality of menu items comprises an application.

8. The method of claim 1, further comprising:
   terminating the displaying of the plurality of menu items after the executing screen of the main menu item is displayed.

9. The method of claim 1, further comprising,
   displaying a new item indicating a combination of the first menu item and the second menu item on the display.

10. A mobile terminal, comprising:
    a memory configured to store menu data for a plurality of menu items, wherein the plurality of menu items comprises a first menu item and a second menu item correspond respectively to a different function that is executable at the mobile terminal;
    a display configured to display the plurality of menu items; and
    a controller configured to:
       select a first menu item and a second menu item from the plurality of menu items, wherein the selecting occurs responsive to user input; and
       receive an touch input for combining the first menu item and the second menu item by moving the first menu item to the second menu item;
       control the display to display an executing screen of a main menu item, wherein the main menu is determined as one of the combined menu items in response to the touch input; and
       control the display to display first data by incorporating second data in executing screen of the main menu item, the first data being data that is associated with the function that corresponds to the main menu item, and the second data being data that is associated with the function that corresponds to a sub menu item of the combined menu items.

11. The mobile terminal of claim 10, wherein the controller is further configured to:
    detect user touch input at the display at an area that generally corresponds to a displayed area of the first menu item, wherein the user touch input comprises a dragging which terminates at an area of the display which generally corresponds to a displayed area of the second menu item.

12. The mobile terminal of claim 10, wherein the controller is further configured to:
    detect first user touch input at the display at an area that generally corresponds to a displayed area of the first menu item;
    detect second user touch input at the display at an area that generally corresponds to a displayed area of the second menu item; and
    wherein the first user touch input and the second user touch input each comprise a dragging that each terminates at a generally same region of the display.

13. The mobile terminal of claim 10, wherein the controller is further configured to:
    detect first user touch input at the display at an area that generally corresponds to a displayed area of the first menu item;

detect second user touch input at the display at an area that generally corresponds to a displayed area of the second menu item; and wherein the selecting of the first menu item and the second menu item occurs when the first user touch input and the second user touch input each occur for a threshold amount of time.

14. The mobile terminal of claim 10, wherein the controller is further configured to:

select a particular item of the second data displayed in the executing screen of the main menu item responsive to further user input; and control the display to display an executing screen of the sub menu item.

15. The mobile terminal of claim 14, wherein the controller is further configured to:

control the display to display third data and fourth data in the executing screen of the sub menu item screen, the third data being data that is associated with the function that corresponds to the selected second menu item, and the fourth data being data that is associated with the function that corresponds to the selected first menu item.

16. The mobile terminal of claim 10, wherein each of the different functions that individually correspond to one of the plurality of menu items comprises an application.

17. The mobile terminal of claim 10, wherein the controller is further configured to:

control the display to terminate the displaying of the plurality of menu items after the executing screen of the main menu item is displayed.

18. The mobile terminal of claim 10, wherein the controller is configured to display a new item indicating a combination of the first menu item and the second menu item on the display.

19. A display method in a mobile terminal, the method comprising:

displaying a plurality of menu items on a touch screen display of the mobile terminal, wherein each of the plurality of menu items corresponds to a different application that is executable at the mobile terminal;

receiving an touch input for combining the first menu item and the second menu item by moving the first menu item to the second menu item;

displaying an executing screen of a main menu item, wherein the main menu is determined as one of the combined menu items in response to the touch input;

executing a first application that corresponds to the main menu item, wherein the executing of the first application causes displaying simultaneously of first data by incorporating second data in the executing screen of the main menu item, the first data being data that is associated with the main menu item, and the second data being data that is associated with the application that corresponds to a sub menu item of the combined menu items; and executing a second application that corresponds to a sub menu item of the combined menu items in response to user selection of a particular item of the second data displayed in the executing screen of the main menu item, wherein the executing of the second application causes displaying of a executing screen of the sub menu item on the display.

20. The method of claim 19, wherein the first application is a contact list that comprises contact information of a first group of a plurality of parties, and the second application is a scheduler which comprises schedule information of a second group of a plurality of parties, wherein a least one party is included in both the first group and the second group.

* * * * *